(12) United States Patent
Hiraki et al.

(10) Patent No.: US 7,972,236 B2
(45) Date of Patent: Jul. 5, 2011

(54) TRANSMISSION SYSTEM

(75) Inventors: Hikosaburo Hiraki, Oyama (JP); Takehiro Komatsu, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 647 days.

(21) Appl. No.: 11/920,823

(22) PCT Filed: Apr. 27, 2006

(86) PCT No.: PCT/JP2006/308857
§ 371 (c)(1),
(2), (4) Date: Nov. 20, 2007

(87) PCT Pub. No.: WO2006/126368
PCT Pub. Date: Nov. 30, 2006

(65) Prior Publication Data
US 2009/0105028 A1   Apr. 23, 2009

(30) Foreign Application Priority Data

May 24, 2005   (JP) ................................. 2005-150598

(51) Int. Cl.
*F16H 3/72* (2006.01)
*F16H 3/44* (2006.01)
(52) U.S. Cl. .............................. 475/5; 475/286; 475/323
(58) Field of Classification Search .............. 475/5, 269, 475/271–292, 149–151, 323
See application file for complete search history.

(56) References Cited

U.S. PATENT DOCUMENTS

| | | |
|---|---|---|
| 3,869,939 A | 3/1975 | Miyao et al. |
| 3,888,139 A | 6/1975 | Orshansky, Jr. |
| 3,982,448 A | 9/1976 | Polak et al. |
| 3,988,949 A | 11/1976 | Weseloh et al. |
| 4,313,351 A | 2/1982 | Hagin |
| 4,471,668 A | 9/1984 | Elsner |
| 4,825,722 A | 5/1989 | Hagin et al. |
| 4,976,664 A | 12/1990 | Hagin et al. |
| 5,518,461 A | 5/1996 | Pfordt |

(Continued)

FOREIGN PATENT DOCUMENTS

DE  2141098  2/1973

(Continued)

OTHER PUBLICATIONS

International Preliminary Report on Patentability, Chapter I of the Patent Cooperation Treaty,and Written Opinion for PCT/JP2006/308857, dated Sep. 18, 2008. 5 sheets.

(Continued)

*Primary Examiner* — Roger Pang
(74) *Attorney, Agent, or Firm* — Holtz, Holtz, Goodman & Chick, PC

(57) ABSTRACT

A sun gear of a first planetary gear train is connected to an input shaft. A carrier 9 of the first planetary gear train is connected to a sun gear of a second planetary gear train and to a first pump/motor. A ring gear of the first planetary gear train is connected to a second pump/motor, and a ring gear of the second planetary gear train is connected to an output shaft. A first clutch is provided for engaging and disengaging a carrier of the second planetary gear train and the ring gear of the first planetary gear train with and from each other, and a second clutch is provided for engaging and disengaging the carrier of the second planetary gear train and a fixed end with and from each other.

4 Claims, 17 Drawing Sheets

U.S. PATENT DOCUMENTS

| | | | |
|---|---|---|---|
| 5,571,058 A | 11/1996 | Schmidt et al. | |
| 5,709,628 A | 1/1998 | Pidde et al. | |
| 5,890,981 A | 4/1999 | Coutant et al. | |
| 6,383,106 B1 | 5/2002 | Kashiwase | |
| 6,478,705 B1 | 11/2002 | Holmes et al. | |
| 6,520,879 B2 | 2/2003 | Kawabata et al. | |
| 6,595,884 B1 * | 7/2003 | Ai et al. | 475/5 |
| 7,070,531 B2 | 7/2006 | Ishizaki | |
| 7,082,760 B2 | 8/2006 | Legner et al. | |
| 7,121,970 B2 | 10/2006 | Funato et al. | |
| 7,195,580 B2 | 3/2007 | Funato et al. | |
| 7,220,203 B2 * | 5/2007 | Holmes et al. | 475/5 |
| 7,252,612 B2 * | 8/2007 | Bucknor et al. | 475/5 |
| 7,299,891 B2 | 11/2007 | Legner | |
| 2002/0142876 A1 | 10/2002 | Holmes et al. | |
| 2003/0008745 A1 | 1/2003 | Heindl | |
| 2005/0064974 A1 * | 3/2005 | Bezian et al. | 475/5 |
| 2005/0096170 A1 * | 5/2005 | Holmes | 475/5 |
| 2006/0019785 A1 * | 1/2006 | Holmes et al. | 475/5 |
| 2006/0025259 A1 * | 2/2006 | Klemen et al. | 475/5 |
| 2006/0166773 A1 * | 7/2006 | Raghavan et al. | 475/5 |
| 2006/0217225 A1 | 9/2006 | Hiraki et al. | |
| 2006/0229153 A1 * | 10/2006 | Bucknor et al. | 475/5 |

FOREIGN PATENT DOCUMENTS

| | | |
|---|---|---|
| DE | 2141098 A1 | 2/1973 |
| DE | 3303448 A1 | 8/1983 |
| DE | 3438561 A1 | 4/1986 |
| DE | 37 33 152 A1 | 4/1989 |
| DE | 4140979 A1 | 6/1993 |
| DE | 4200692 A1 | 7/1993 |
| DE | 19747459 A1 | 5/1999 |
| EP | 0026115 A2 | 4/1981 |
| EP | 0234135 A1 | 9/1987 |
| FR | 2520827 A1 | 8/1983 |
| GB | 2222212 A1 | 2/1990 |
| GB | 2 377 260 A | 1/2003 |
| JP | 50-136571 A | 10/1973 |
| JP | 48-85959 | 11/1973 |
| JP | 48-85959 A | 11/1973 |
| JP | 49-3060 | 1/1974 |
| JP | 49-14934 | 4/1974 |
| JP | 49-56068 A | 5/1974 |
| JP | 50-85019 | 7/1975 |
| JP | 50-85019 A | 7/1975 |
| JP | 50-136571 | 10/1975 |
| JP | 50-136571 A | 10/1975 |
| JP | 51-140068 | 12/1976 |
| JP | 10-159939 A | 6/1998 |
| JP | 11-037250 A | 2/1999 |
| JP | 11-051149 A | 2/1999 |
| JP | 11-321357 A | 11/1999 |
| JP | 2000-179648 A | 6/2000 |
| JP | 2001-200900 A | 7/2001 |
| JP | 2001-208004 A | 8/2001 |
| JP | 2001-336602 A | 12/2001 |
| JP | 2003-164007 A | 6/2003 |
| JP | 2005-127485 A | 5/2005 |

OTHER PUBLICATIONS

Tomoo Ishihara et al ,"Design of Hydraulic Power Transmission." Mechanical Design Series, Issued by Ohmsha, Ltd.

U.S. Appl. No. 10/556,843, filed Nov. 16, 2005, entitled "Transmission," Inventor: H. Hiraki et al.

U.S. Appl. No. 11/662,327, filed Mar. 8, 2007, entitled "Transmission," Inventor: H. Hiraki et al.

U.S. Appl. No. 11/961,918, filed Dec. 20, 2007, entitled Speed-Changing Device, Inventor: H. Hiraki et al.

Invitation pursuant to Rule 62a(1) EPC (European Office Action) dated Jun. 1, 2010, in English in counterpart European Application No. 06732413.7.

Japanese Office Action dated Mar. 17, 2010 and English translation thereof issued in counterpart Japanese Application No. 2005-506321.

Extended European Search Report dated Mar. 3, 2010 (in English) issued in European Application No. 05781320.6-2421/1798447, which is a counterpart of related U.S. Appl. No. 11/662,327.

Extended European Search Report dated Aug. 17, 2010 (in English) issued in counterpart European Application No. 06732413.7.

* cited by examiner

TRANSMISSION SYSTEM

This application is a U.S. National Phase Application under 35 USC 371 of International Application PCT/JP2006/308857 filed Apr. 27, 2006.

TECHNICAL FIELD

The present invention relates to a hydro-mechanical transmission system having pumps/motors in combination with planetary gear trains or an electro-mechanical transmission system having generators/motors in combination with planetary gear trains.

BACKGROUND ART

As hydraulic transmission systems, there have been known hydrostatic transmissions (HST) that convert all the input power from the engine into hydraulic pressure for power transmission and hydro-mechanical (power split type) transmissions (HMT) that convert part of the input power into hydraulic pressure while mechanically transmitting the rest of it. Of these types of transmissions, the latter transmissions (HMT) are advantageous over the former transmissions (HST) since HMTs only convert part of the mechanical power into hydraulic power and therefore exert high mechanical power transmission efficiency. For this reason, HMTs are regarded as ideal transmissions for work vehicles subjected to significant load fluctuations such as bulldozers and wheel loaders and applied to some of such vehicles.

In a typical hydro-mechanical transmission (HMT), its infinitely variable speed characteristics are attained by a planetary gear train. Specifically, the planetary gear train has three elements, i.e., a sun gear, a carrier having planetary gears and a ring gear. Of these three elements, the first and second elements are coupled to the input shaft and output shaft respectively and the third element is coupled to a hydraulic pump or hydraulic motor. The rotational speed of the hydraulic pump or hydraulic motor is varied to change the rotational speed of the output shaft.

HMTs are classified into two types. One is the output split type in which a first pump/motor is coupled to a planetary gear train and a second pump/motor connected to the first pump through a hydraulic circuit is coupled to the input shaft of the transmission system at a constant rotation ratio. The other is the input split type in which a first hydraulic pump or hydraulic motor is coupled to a planetary gear train and a second hydraulic pump or hydraulic motor connected to the first one through a hydraulic circuit is coupled to the output shaft of the transmission system at a constant rotation ratio.

As a technique similar to HMTs, electro-mechanical transmissions (EMT) are known. EMTs use generators/motors in place of the pumps/motors used in HMTs and convert part of mechanical power into electric power for power transmission. A prior art technique associated with EMTs is disclosed in Patent Document 1. The transmission system disclosed in this document is an electro-mechanical transmission that has two planetary gear trains and two electric motors and is configured to be switched by clutches to establish an input split mode to provide a low speed range and a compound split mode to provide a high speed range.

Patent Document: U.S. Pat. No. 6,478,705

FIG. 16 shows a schematic diagram of a transmission system constructed according to Patent Document 1. The transmission system 100 shown in FIG. 16 has an input shaft 103 that inputs power sent from an engine 101 through a clutch 102; two planetary gearsets 104, 105 aligned coaxially with the input shaft 103; two generators/motors 106, 107 aligned coaxially with the planetary gearsets 104, 105; an output shaft 108 coupled to vehicle drive wheels (not shown) through a differential gearset (not shown); and a pair of selectively engageable clutches 109, 110. Each of the planetary gearsets 104, 105 is composed of a sun gear 111 (112); a plurality of planetary gears 113 (114) in meshing engagement with the outer periphery of the sun gear 111 (112); a carrier 115 (116) for supporting the shaft of the planetary gears 113 (114); and a ring gear 117 (118) in meshing engagement with the outer periphery of the planetary gears 113 (114).

Herein, the ring gear 117 of the planetary gearset 104 is connected to the input shaft 103. The carrier 115 of the planetary gearset 104 and the carrier 116 of the planetary gearset 105 are coupled to each other by the output shaft 108 so as to be rotatable together with the output shaft 108. The sun gears 111, 112 of the planetary gearsets 104, 105 are coupled to the rotors 106a, 107a of the generators/motors 106, 107 through sleeve shafts 119, 120, respectively, which are fitted on the output shaft 108. The clutch 109 is for connecting and disconnecting the ring gear 118 to and from the fixed end, whereas the clutch 110 is for connecting and disconnecting the ring gear 118 to and from the sleeve shaft 119. The stator 106b of the generator/motor 106 and the stator 107b of the generator/motor 107 are electrically connected to a storage battery 122 through an ECU (electronic control unit) 121.

In the transmission system 100, shifting between the input split mode and the compound split mode is effected at a vehicle speed at which the rotational speed of the generator/motor 106 becomes zero (this vehicle speed is hereinafter referred to as "mode switching point"). That is, if the current vehicle speed is within a vehicle speed range below the mode switching point, the clutch 109 is engaged and the clutch 110 is disengaged, thereby establishing the input split mode. On the other hand, if the current vehicle speed is within a vehicle speed range above the mode switching point, the clutch 109 is disengaged whereas the clutch 110 is engaged thereby establishing the compound split mode.

Setting of the mode switching point may be carried out in three patterns. In the first pattern, the mode switching point is set to a vehicle speed Vb that is just a half of a vehicle speed Vd at which the rotational speed of the generator/motor 107 becomes zero, as shown in FIG. 17(a). The second pattern is such that the mode switching point is set to a vehicle speed Vc that is higher than the vehicle speed Vb as shown in FIG. 17(b). In the third pattern, the mode switching point is set to a vehicle speed Va that is lower than the vehicle speed Vb as shown in FIG. 17(c). It should be noted that FIGS. 17(a) to 17(c) each show changes in the rotational speeds of the generators/motors 106, 107 in cases where the vehicle is accelerated in the forward direction with the rotational speed of the engine 101 being kept constant. In FIGS. 17(a) to 17(c), vehicle speed is plotted on the abscissa and the rotational speeds of the generators/motors 106, 107 on the ordinate. Solid line indicated by A represents the change of the rotational speed of the generator/motor 107 relative to vehicle speed and broken line indicated by B represents the change of the rotational speed of the generator/motor 106 relative to vehicle speed.

At the speed at which the rotational speed of the generator/motor 106 becomes zero (i.e., the mode switching point (Vb in FIG. 17(a); Vc in FIG. 17(b); and Va in FIG. 17(c)), the rotational speed of the generator/motor 106 is zero and therefore the engine power is not converted into electric power, so that all of the engine power is transmitted to the output shaft 108 through the mechanical mechanism alone. This "mode switching point" is also called "low speed side direct point".

Also, at the speed at which the rotational speed of the generator/motor 107 becomes zero in the speed range corresponding to the compound split mode (i.e., Vd in FIGS. 17(*a*) to 17(*c*)), the engine power is not converted into electric power but entirely transmitted to the output shaft 108 mechanically. This speed is hereinafter referred to as "high speed side direct point".

In the planetary gearset 104, the ring gear (the third element) 117 is connected to the input shaft 103, the carrier (the second element) 115 is to the output shaft 108, and the sun gear (the first element) 111 is to the rotor 106*a* of the generator/motor 106. Therefore, if vehicle speed (the rotational speed of the output shaft 108) linearly changes with the rotational speed of the engine 101 being kept constant, the rotational speed of the generator/motor 106 will linearly change in all the modes, i.e., the input split mode and the compound split mode as indicated by broken line B in FIGS. 17(*a*) to 17(*c*). In other words, the rotational speed of the generator/motor 106 is directly affected by the rotational speed of the output shaft 108 throughout all the modes, i.e., the input split mode and the compound split mode.

Therefore, in the first pattern shown in FIG. 17(*a*), the rotating direction of the generator/motor 106 in the vehicle speed range of zero vehicle speed to the vehicle speed Vb (when the input split mode is selected) differs from the rotating direction of the generator/motor 106 in the vehicle speed range of the vehicle speed Vb to the vehicle speed Vd (when the compound split mode is selected). In addition, the relationship between the rotational speed Na of the generator/motor 106 at zero vehicle speed and the rotational speed Nb of the generator/motor 106 at the vehicle speed Vd is represented by Na=Nb. In the second pattern shown in FIG. 17(*b*), the rotating direction of the generator/motor 106 in the vehicle speed range of zero vehicle speed to the vehicle speed Vc (when the input split mode is selected) differs from the rotating direction of the generator/motor 106 in the vehicle speed range of the vehicle speed Vc to the vehicle speed Vd (when the compound split mode is selected), and the relationship between the rotational speed Nc of the generator/motor 106 at zero vehicle speed and the rotational speed Nd of the generator/motor 106 at the vehicle speed Vd is represented by Nc>Nd. In the third pattern shown in FIG. 17(*c*), the rotating direction of the generator/motor 106 in the vehicle speed range of zero vehicle speed to the vehicle speed Va (when the input split mode is selected) differs from the rotating direction of the generator/motor 106 in the vehicle speed range of the vehicle speed Va to the vehicle speed Vd (when the compound split mode is selected), and the relationship between the rotational speed Ne of the generator/motor 106 at zero vehicle speed and the rotational speed Nf of the generator/motor 106 at the vehicle speed Vd is represented by Ne<Nf.

DISCLOSURE OF THE INVENTION

Problems that the Invention Intends to Solve

Each of the above direct points is the most efficient vehicle speed at which all of the power coming from the engine 101 is transmitted through the mechanical mechanism alone. For setting the mode switching point, the first pattern shown in FIG. 17(*a*) or the second pattern shown in FIG. 17(*b*) are suitably adopted in the case of vehicles such as buses and transport trucks which often travel at intermediate speeds and high speeds, and the third pattern shown in FIG. 17(*c*) is suitably adopted in the case of construction vehicles such as bulldozers and wheel loaders which often operate to work at low speeds and travel at high speeds.

However, if the prior art transmission system 100 adopts the second pattern shown in FIG. 17(*b*) for setting the mode switching point, imbalance occurs between the applicable rotational speed range (0 to Nc) of the generator/motor 106 in the input split mode and the applicable rotational speed range (0 to Nd) of the generator/motor 106 in the compound split mode. This causes a problem that the generator/motor 106 is required to have high capacity to exert sufficient ability (torque) even for relatively low rotational speed Nd (<Nc). As a result, a large-sized, costly generator/motor has to be employed as the generator/motor 106. If the third pattern shown in FIG. 17(*c*) is adopted for setting the mode switching point in the transmission system 100, imbalance occurs between the applicable rotational speed range (0 to Ne) of the generator/motor 106 in the input split mode and the applicable rotational speed range (0 to Nf) of the generator/motor 106 in the compound split mode. This also requires the generator/motor 106 to have high capacity to exert sufficient ability (torque) even for relatively low rotational speed Ne (<Nf), resulting in use of a large-sized, costly generator/motor as the generator/motor 106.

It is apparent that the same problem as described above occurs in the case of hydro-mechanical transmissions (HMT) in which pumps/motors are used in place of the generators/motors 106, 107 of the prior art transmission system 100 and part of the mechanical power is converted into hydraulic power for power transmission. Further, in the case of HMTs, the rotating direction of the pump/motor corresponding to the generator/motor 106 when vehicle speed is zero is opposite to the rotating direction when vehicle speed is Vd and therefore a bi-directional pump/motor has to be used as this pump/motor.

The present invention is directed to overcoming the foregoing problems and a primary object of the invention is therefore to provide a hydro-mechanical transmission system or electro-mechanical transmission system that enables use of pumps/motors or generators/motors smaller in capacity compared to the prior art, irrespective of setting of the mode switching point that is the criterion of shifting between the input split mode and the compound split mode.

Means for Solving the Problem

In accomplishing the above object, there has been provided, in accordance with a first aspect of the invention, a transmission system comprising an input shaft, an output shaft, a mechanical transmission section and a hydraulic transmission section, the mechanical and hydraulic transmission sections being interposed between the input shaft and the output shaft, the hydraulic transmission section including a plurality of pumps/motors which are connectable to each other through a hydraulic circuit, wherein the mechanical transmission section has a first planetary gear train and a second planetary gear train;

wherein the plurality of pumps/motors consist of a first pump/motor and a second pump/motor;

wherein a first element of the first planetary gear train is connected to the input shaft, a second element of the first planetary gear train is connected to a first element of the second planetary gear train and to the first pump/motor, a third element of the first planetary gear train is connected to the second pump/motor, and a third element of the second planetary gear train is connected to the output shaft;

wherein a first clutch is provided for engaging and disengaging a second element of the second planetary gear train and the third element of the first planetary gear train with and from each other; and wherein a second clutch is provided for engaging and disengaging the second element of the second planetary gear train and a fixed end with and from each other.

According to a second aspect of the invention, there is provided a transmission system comprising an input shaft, an output shaft, a mechanical transmission section and a hydraulic transmission section, the mechanical and hydraulic transmission sections being interposed between the input shaft and the output shaft, the hydraulic transmission section including a plurality of pumps/motors which are connectable to each other through a hydraulic circuit, wherein the mechanical transmission section has a first planetary gear train and a second planetary gear train;

wherein the plurality of pumps/motors consist of a first pump/motor, a second pump/motor and a third pump/motor;

wherein a first element of the first planetary gear train is connected to the input shaft, a second element of the first planetary gear train is connected to a first element of the second planetary gear train and to the first pump/motor, a third element of the first planetary gear train is connected to the second pump/motor, and a third element of the second planetary gear train is connected to the output shaft;

wherein a first clutch is provided for engaging and disengaging a second element of the second planetary gear train and the third element of the first planetary gear train with and from each other;

wherein a second clutch is provided for engaging and disengaging the second element of the second planetary gear train and a fixed end with and from each other; and wherein a switching mechanism is provided for selectively connecting the third pump/motor to either the first pump/motor side or second pump/motor side.

According to a third aspect of the invention, there is provided a transmission system comprising an input shaft, an output shaft, a mechanical transmission section and a hydraulic transmission section, the mechanical and hydraulic transmission sections being interposed between the input shaft and the output shaft, the hydraulic transmission section including a plurality of pumps/motors which are connectable to each other through a hydraulic circuit, wherein the mechanical transmission section has a first planetary gear train and a second planetary gear train, wherein the plurality of pumps/motors consist of a first pump/motor and a second pump/motor;

wherein a first element of the first planetary gear train is connected to the input shaft, a third element of the first planetary gear train is connected to a first element of the second planetary gear train and to the first pump/motor, a second element of the first planetary gear train is connected to the second pump/motor, and a third element of the second planetary gear train is connected to the output shaft;

wherein a first clutch is provided for engaging and disengaging a second element of the second planetary gear train and the second element of the first planetary gear train with and from each other; and wherein a second clutch is provided for engaging and disengaging the second element of the second planetary gear train and a fixed end with and from each other.

According to a fourth aspect of the invention, there is provided a transmission system comprising an input shaft, an output shaft, a mechanical transmission section and a hydraulic transmission section, the mechanical and hydraulic transmission sections being interposed between the input shaft and the output shaft, the hydraulic transmission section including a plurality of pumps/motors which are connectable to each other through a hydraulic circuit, wherein the mechanical transmission section has a first planetary gear train and a second planetary gear train;

wherein the plurality of pumps/motors consist of a first pump/motor, a second pump/motor and a third pump/motor;

wherein a first element of the first planetary gear train is connected to the input shaft, a third element of the first planetary gear train is connected to a first element of the second planetary gear train and to the first pump/motor, a second element of the first planetary gear train is connected to the second pump/motor, and a third element of the second planetary gear train is connected to the output shaft;

wherein a first clutch is provided for engaging and disengaging a second element of the second planetary gear train and the second element of the first planetary gear train with and from each other;

wherein a second clutch is provided for engaging and disengaging the second element of the second planetary gear train and a fixed end with and from each other; and wherein a switching mechanism is provided for selectively connecting the third pump/motor to either a first pump/motor side or second pump/motor side.

The transmission system according to the second or fourth aspect of the invention preferably comprises a switching valve for effecting switching such that a flow of pressure oil to the third pump/motor is constantly directed in a fixed direction (a fifth aspect of the invention).

The transmission system according to any one of the first to fourth aspects of the invention is preferably configured such that the speed ratio of a low speed side direct point at which a rotational speed of the second pump/motor becomes zero to a high speed side direct point at which a rotational speed of the first pump/motor becomes zero is set to 3 to 4 (a seventh aspect of the invention).

According to an eighth aspect of the invention, there is provided a transmission system comprising an input shaft, an output shaft, a mechanical transmission section and an electric transmission section, the mechanical and electric transmission sections being interposed between the input shaft and the output shaft, the electric transmission section including a plurality of generators/motors which are drivingly controlled by an inverter, wherein the mechanical transmission section has a first planetary gear train and a second planetary gear train;

wherein the plurality of generators/motors consist of a first generator/motor and a second generator/motor;

wherein a first element of the first planetary gear train is connected to the input shaft, a second element of the first planetary gear train is connected to a first element of the second planetary gear train and to the first generator/motor, a third element of the first planetary gear train is connected to the second generator/motor, and a third element of the second planetary gear train is connected to the output shaft;

wherein a first clutch is provided for engaging and disengaging a second element of the second planetary gear train and the third element of the first planetary gear train with and from each other; and wherein a second clutch is provided for engaging and disengaging the second element of the second planetary gear train and a fixed end with and from each other.

According to a ninth aspect of the invention, there is provided a transmission system comprising an input shaft, an output shaft, a mechanical transmission section and an electric transmission section, the mechanical and electric transmission sections being interposed between the input shaft and the output shaft, the electric transmission section including a plurality of generators/motors which are drivingly controlled by an inverter, wherein the mechanical transmission section has a first planetary gear train and a second planetary gear train;

wherein the plurality of generators/motors consist of a first generator/motor, a second generator/motor and a third generator/motor;

wherein a first element of the first planetary gear train is connected to the input shaft, a second element of the first planetary gear train is connected to a first element of the second planetary gear train and to the first generator/motor, a third element of the first planetary gear train is connected to the second generator/motor, and a third element of the second planetary gear train is connected to the output shaft;

wherein a first clutch is provided for engaging and disengaging a second element of the second planetary gear train and the third element of the first planetary gear train with and from each other;

wherein a second clutch is provided for engaging and disengaging the second element of the second planetary gear train and a fixed end with and from each other; and wherein a switching mechanism is provided for selectively connecting the third generator/motor to either a first generator/motor side or second generator/motor side.

According to a tenth aspect of the invention, there is provided a transmission system comprising an input shaft, an output shaft, a mechanical transmission section and an electric transmission section, the mechanical and electric transmission sections being interposed between the input shaft and the output shaft, the electric transmission section including a plurality of generators/motors which are drivingly controlled by an inverter, wherein the mechanical transmission section has a first planetary gear train and a second planetary gear train;

wherein the plurality of generators/motors consist of a first generator/motor and a second generator/motor;

wherein a first element of the first planetary gear train is connected to the input shaft, a third element of the first planetary gear train is connected to a first element of the second planetary gear train and to the first generator/motor, a second element of the first planetary gear train is connected to the second generator/motor, and a third element of the second planetary gear train is connected to the output shaft;

wherein a first clutch is provided for engaging and disengaging a second element of the second planetary gear train and the second element of the first planetary gear train with and from each other; and wherein a second clutch is provided for engaging and disengaging the second element of the second planetary gear train and a fixed end with and from each other.

According to an eleventh aspect of the invention, there is provided a transmission system comprising an input shaft, an output shaft, a mechanical transmission section and an electric transmission section, the mechanical and electric transmission sections being interposed between the input shaft and the output shaft, the electric transmission section including a plurality of generators/motors which are drivingly controlled by an inverter, wherein the mechanical transmission section has a first planetary gear train and a second planetary gear train;

wherein the plurality of generators/motors consist of a first generator/motor, a second generator/motor and a third generator/motor;

wherein a first element of the first planetary gear train is connected to the input shaft, a third element of the first planetary gear train is connected to a first element of the second planetary gear train and to the first generator/motor, a second element of the first planetary gear train is connected to the second generator/motor, and a third element of the second planetary gear train is connected to the output shaft;

wherein a first clutch is provided for engaging and disengaging a second element of the second planetary gear train and the second element of the first planetary gear train with and from each other;

wherein a second clutch is provided for engaging and disengaging the second element of the second planetary gear train and a fixed end with and from each other; and wherein a switching mechanism is provided for selectively connecting the third generator/motor to either a first generator/motor side or second generator/motor side.

The transmission system according to any one of the eighth to eleventh aspects of the invention is preferably configured such that the speed ratio of a low speed side direct point at which a rotational speed of the second generator/motor becomes zero to a high speed side direct point at which a rotational speed of the first generator/motor becomes zero is set to 3 to 4 (a twelfth aspect of the invention).

Effects of the Invention

In cases where the transmission system of the first aspect is applied to a vehicle, shifting between the input split mode and a compound split mode is effected on the basis of the vehicle speed (hereinafter referred to as "mode switching point") at which the rotational speed of the second pump/motor becomes zero. More specifically, if the present vehicle speed is within a vehicle speed range below the mode switching point, the first clutch disengages the second element of the second planetary gear train from the third element of the first planetary gear train, whereas the second clutch engages the second element of the second planetary gear train with the fixed end, whereby the input split mode is established. At zero vehicle speed that provides the input split mode, the rotational speed of the first pump/motor is zero and the rotational speed Nx of the second pump/motor for a certain input rotational speed is uniquely determined in accordance with the tooth number ratio of the first planetary gear train. At a high speed side direct point that provides the compound split mode (i.e., when the rotational speed of the first pump/motor is zero), the rotational speed Ny of the second pump/motor for the certain input rotational speed is uniquely determined in accordance with the tooth number ratio of the first planetary gear train. Therefore, Nx=Ny and these modes can be made equal to each other in terms of the rotational speed and rotating direction of the second pump/motor. Therefore, whatever vehicle speed the mode switching point is set to, the applicable rotational speed range of the second pump/motor in the input split mode and the applicable rotational speed range of the second pump/motor in the compound split mode can be evenly balanced, so that a pump/motor having smaller capacity than that of the prior art can be used as the second pump/motor. In addition, since the rotating direction in the input split mode is the same as in the compound split mode, a mono-directional pump/motor can be used as the second pump/motor.

The transmission system of the second aspect has the same basic configuration as of the transmission system of the first aspect and therefore the same operational effects as of the first aspect. Further, in the transmission system of the second aspect, the third pump/motor can be selectively connected to the first pump/motor side and the second pump/motor side to consistently assist the function of either the first or second pump/motor. As a result, pumps/motors having smaller capacity can be used for these pumps/motors.

In cases where the transmission system of the third aspect is applied to a vehicle, shifting between the input split mode and the compound split mode can be effected, similarly to the first aspect, on the basis of the vehicle speed (mode switching point) at which the rotational speed of the second pump/motor becomes zero. More specifically, if the present vehicle speed is within a vehicle speed range below the mode switching point, the first clutch disengages the second element of the second planetary gear train from the second element of the first planetary gear train, whereas the second clutch engages the second element of the second planetary gear train with the fixed end, whereby the input split mode is established. At zero vehicle speed that provides the input split mode, the rotational speed of the first pump/motor is zero and the rotational speed Nx' of the second pump/motor for a certain input rotational speed is uniquely determined in accordance with the tooth number ratio of the first planetary gear train. At the high speed side direct point that provides the compound split mode (i.e., when the rotational speed of the first pump/motor is zero), the rotational speed Ny' of the second pump/motor for the certain input rotational speed is uniquely determined in accordance with the tooth number ratio of the first planetary gear train. Therefore, Nx'=Ny' and these modes can be made equal to each other in terms of the rotational speed and rotating direction of the second pump/motor. Therefore, whatever vehicle speed the mode switching point is set to, the applicable rotational speed range of the second pump/motor in the input split mode and the applicable rotational speed range of the second pump/motor in the compound split mode can be evenly balanced like the first aspect, so that a pump/motor having smaller capacity than that of the prior art can be used as the second pump/motor. In addition, since the rotating direction in the input split mode is the same as in the compound split mode, a mono-directional pump/motor can be used as the second pump/motor.

The transmission system of the fourth aspect has the same basic configuration as of the transmission system of the third aspect and therefore the same operational effects as of the third aspect. Further, in the transmission system of the fourth aspect, the third pump/motor can be selectively connected to the first pump/motor side and the second pump/motor side to consistently assist the function of either the first or second pump/motor. As a result, pumps/motors having smaller capacity can be used for these pumps/motors.

Adoption of the configuration of the transmission system of the fifth aspect makes it possible to use an inexpensive mono-directional pump/motor as the third pump/motor.

The transmission systems of the seventh and twelfth aspects have the effect of providing excellent power transmission efficiency when applied to a construction vehicle.

The transmission system of the eighth aspect is an electric-mechanical transmission system corresponding to the hydraulic-mechanical transmission system of the first aspect and therefore a compact generator/motor having smaller capacity than the prior art can be used as the second generator/motor, similarly to the first aspect.

The transmission system of the ninth aspect is an electric-mechanical transmission system corresponding to the hydraulic-mechanical transmission system of the second aspect and therefore compact generators/motors having smaller capacity than the prior art can be used as the generators/motors, similarly to the second aspect.

The transmission system of the tenth aspect is an electric-mechanical transmission system corresponding to the hydraulic-mechanical transmission system of the third aspect and therefore a compact generator/motor having smaller capacity than the prior art can be used as the second generator/motor, similarly to the third aspect.

The transmission system of the eleventh aspect is an electric-mechanical transmission system corresponding to the hydraulic-mechanical transmission system of the fourth aspect and therefore compact generators/motors having smaller capacity than the prior art can be used as the generators/motors, similarly to the fourth aspect.

Figure 1:
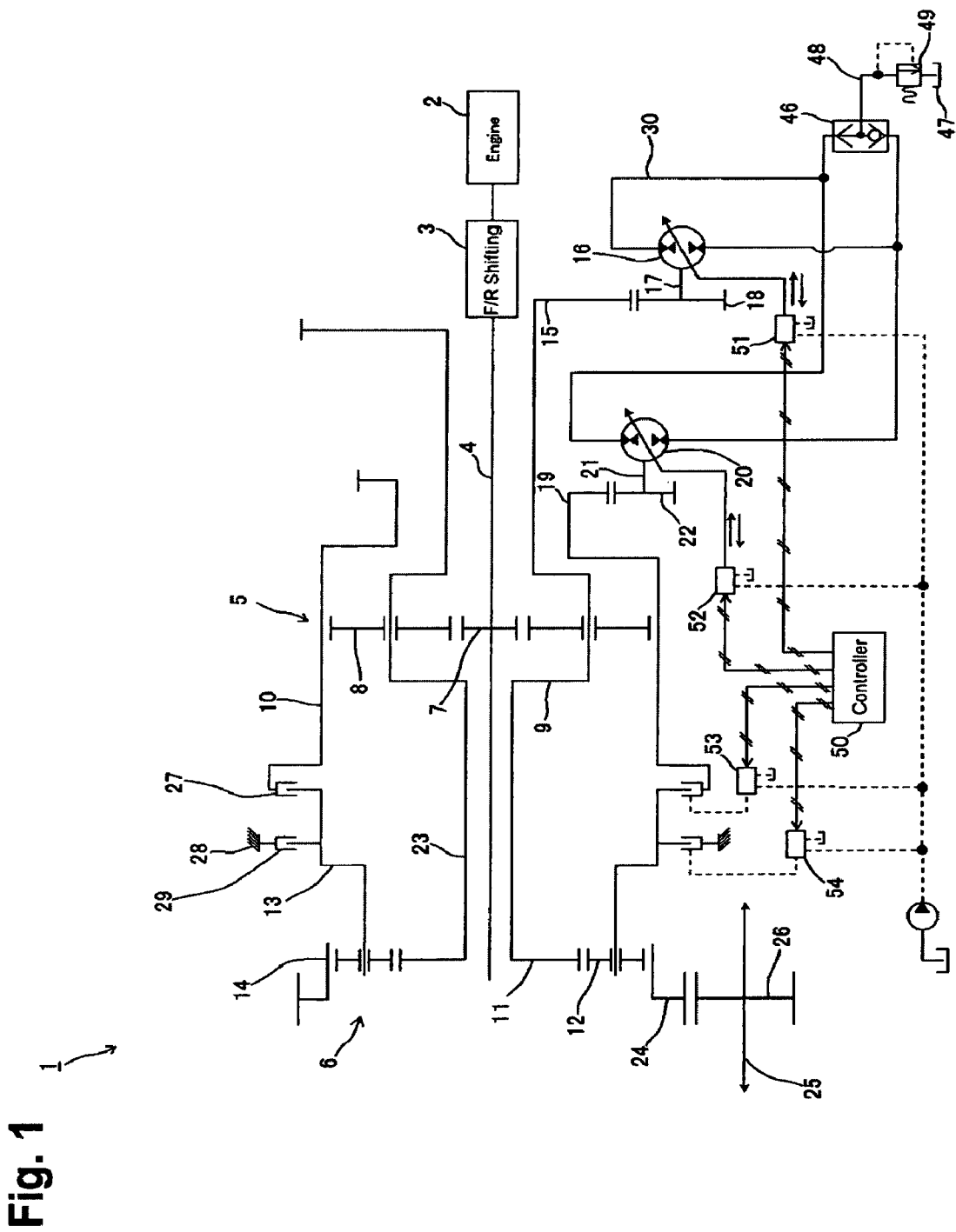
FIG. 1 is a schematic structural diagram of a transmission system according to a first embodiment of the invention.

EXPLANATION OF REFERENCE NUMERALS 1, 1A to 1I: transmission system
2: engine
4: input shaft
5: first planetary gear train
6: second planetary gear train
7, 11: sun gear (first element)
8, 12: planetary gears
9, 13: carrier (second element)
10, 14: ring gear (third element)
16: first pump/motor
16A: first generator/motor
20: second pump/motor
20A: second generator/motor
25: output shaft
27: first clutch
28: fixed end
29: second clutch
30, 32: hydraulic pipeline (hydraulic circuit)
31: third pump/motor
31A: third generator/motor
37: third clutch 40: fourth clutch
43: switching valve
44, 44A: switching mechanism
50, 50A: controller

BEST MODE FOR CARRYING OUT THE INVENTION

Referring now to the accompanying drawings, the transmission system of the invention will be hereinafter described according to preferred embodiments.

First Embodiment

FIG. 1 shows a schematic structural diagram of a transmission system constructed according to a first embodiment of the invention. The first embodiment is associated with a transmission system applied to a construction vehicle such as bulldozers and wheel loaders.

The transmission system 1 of the first embodiment has an input shaft 4 that inputs power from an engine 2 through a forward/reverse switching mechanism 3. The transmission system 1 also includes a first planetary gear train 5 and a second planetary gear train 6 which are coaxially aligned with the input shaft 4.

The first planetary gear train 5 includes a sun gear 7 secured to the input shaft 4; a plurality of planetary gears 8 in meshing engagement with the outer periphery of the sun gear 7; a carrier 9 for supporting the shaft of the planetary gears 8; and a ring gear 10 in meshing engagement with the outer periphery of the group of the planetary gears 8. The second planetary gear train 6 includes a sun gear 11; a plurality of planetary gears 12 in meshing engagement with the outer periphery of the sun gear 11; a carrier 13 for supporting the shaft of the planetary gears 12; and a ring gear 14 in meshing engagement with the outer periphery of the group of the planetary gears 12.

A first gear 15 is integrally coupled to the carrier 9 of the first planetary gear train 5, and a second gear 18 secured to an output shaft 17 of a first pump/motor 16 is in meshing engagement with the first gear 15. A third gear 19 is integrally coupled to the ring gear 10 of the first planetary gear train 5, and a fourth gear 22 secured to an output shaft 21 of a second pump/motor 20 is in meshing engagement with the third gear 19. The carrier 9 of the first planetary gear train 5 and the sun gear 11 of the second planetary gear train 6 are coupled to each other by means of a sleeve shaft 23 rotatably supported on the input shaft 4. A fifth gear 24 is integrally coupled to the ring gear 14 of the planetary gear train 6 and a sixth gear 26 secured to an output shaft 25 is in meshing engagement with the fifth gear 24.

The transmission system 1 is equipped with a first clutch 27 for connecting and disconnecting the carrier 13 of the second planetary gear train 6 to and from the ring gear 10 of the first planetary gear train 5 and with a second clutch 29 for connecting and disconnecting the carrier 13 of the second planetary gear train 6 to and from a fixed end 28. The first pump/motor 16 and the second pump/motor 20 are connected to each other through a hydraulic pipeline 30. The hydraulic pipeline 30 is provided with a shuttle valve 46 whereas a pipeline 48 for connecting the shuttle valve 46 to a tank 47 is provided with a relief valve 49.

The first pump/motor 16 and the second pump/motor 20 are both variable displacement hydraulic pumps/motors. The first pump/motor 16 has a first pump/motor displacement control system 51 for controlling the displacement of the first pump/motor in response to an instruction signal from a controller 50. The second pump/motor 20 is also provided with a second pump/motor displacement control system 52 for similarly controlling the displacement of the second pump/motor 20 in response to an instruction signal from the controller 50. The first clutch 27 and the second clutch 29 are both hydraulically actuated clutches. The first clutch 27 has a first clutch pressure control valve 53 for controlling the clutch pressure of the first clutch 27 in response to an instruction signal from the controller 50. The second clutch 29 has a second clutch pressure control valve 54 for similarly controlling the clutch pressure of the second clutch 29 in response to an instruction signal from the controller 50. Herein, the controller 50 is composed of a central processing unit (CPU) for mainly executing a specified program; a read only memory (ROM) for storing this specified program and various tables; a random access memory (RAM) that serves as a working memory necessary for executing the program; an input interface; and an output interface.

Figure 2:
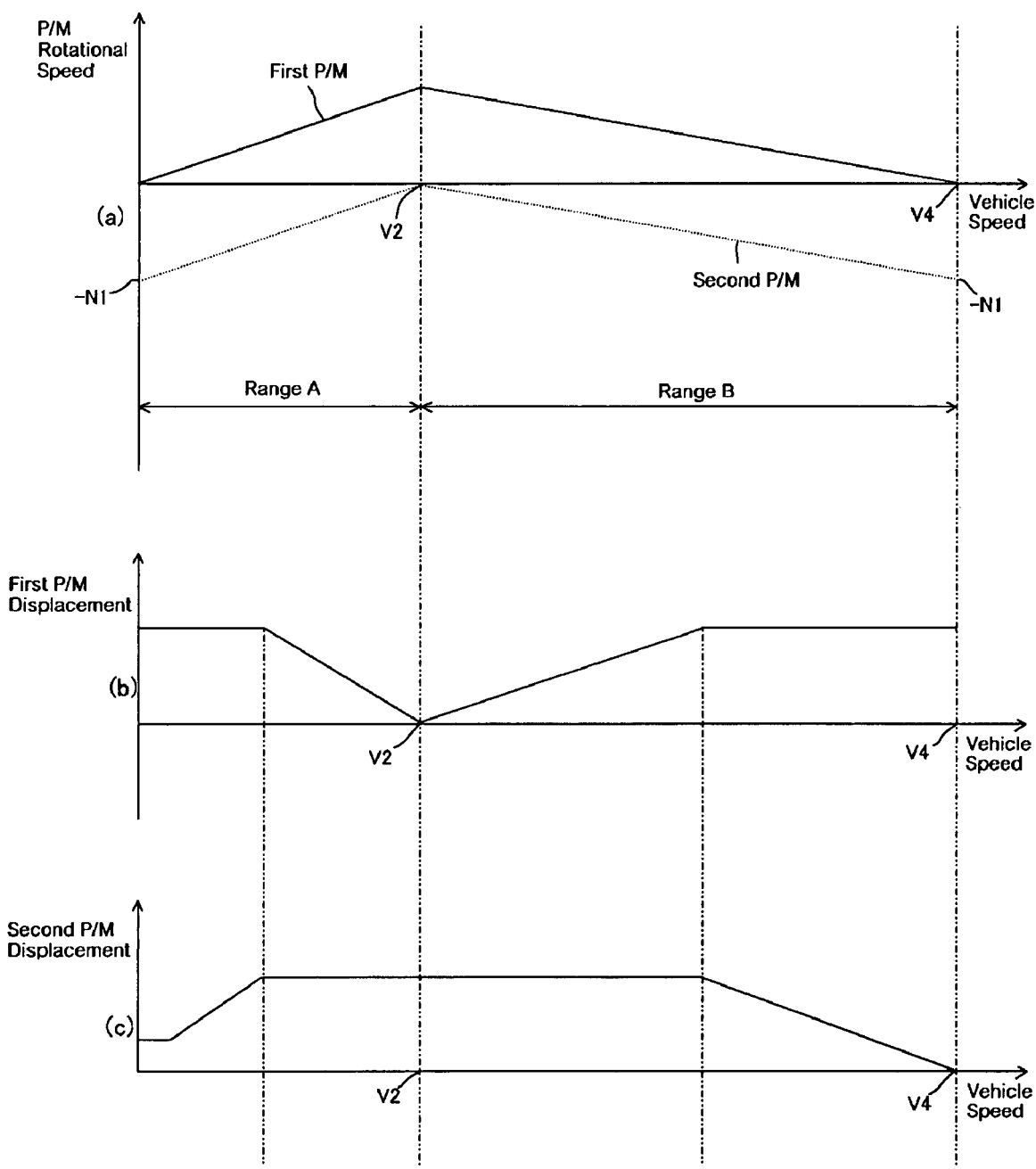
FIG. 2 is operating characteristic graphs of the transmission system according to the first embodiment.

Reference is made to FIG. 2 and Table 1 to explain a case where vehicle speed is accelerated from zero while keeping the input rotational speed transmitted from the engine 2 to the input shaft 4 constant in the transmission system 1 of the invention. FIG. 2 shows operating characteristic graphs of the transmission system of this embodiment. Specifically, FIG. 2(a) is a graph showing changes in the rotational speed of each pump/motor relative to vehicle speed; FIG. 2(b) is a graph showing changes in the displacement of the first pump/motor relative to vehicle speed; and FIG. 2(c) is a graph showing changes in the displacement of the second pump/motor relative to vehicle speed. Table 1 shows the operating condition (ON (connected)/OFF (disconnected) state) of each clutch in relation to vehicle speed ranges. In FIG. 2(a), solid line represents changes in the rotational speed of the first pump/motor relative to vehicle speed whereas dotted line represents changes in the rotational speed of the second pump/motor relative to vehicle speed.

TABLE 1

|  | Vehicle Speed Range A | Vehicle Speed Range B |
| --- | --- | --- |
| First Clutch | OFF | ON |
| Second Clutch | ON | OFF |

The displacements of the pumps/motors 16, 20 are controlled according to vehicle speed as shown in FIGS. 2(b), 2(c), by means of the first and second pump/motor displacement control systems 51, 52, respectively, that operate in response to instruction signals from the controller 50. As a result, the rotational speeds of the pumps/motors 16, 20 vary as shown in FIG. 2(a). At a vehicle speed V2 which serves as the switching point and at which the displacement of the first pump/motor 16 becomes zero, the first and second clutches 27, 29 are switched as shown in Table 1 by the first and second clutch pressure control valves 53, 54, respectively, that operate in response to instruction signals from the controller 50.

As shown in Table 1, in the vehicle speed range A not higher than the vehicle speed V2, the first clutch 27 is turned OFF to disengage the carrier 13 of the second planetary gear train 6 from the ring gear 10 of the first planetary gear train 5, whereas the second clutch 29 is turned ON to engage the carrier 13 of the second planetary gear train 6 with the fixed end 28, thereby establishing the input split mode. At that time, the power of the engine 2 is input to the sun gear 7 of the first planetary gear train 5 and this power is output from the carrier 9 to the sun gear 11 of the second planetary gear train 6 through the sleeve shaft 23. The power input to the sun gear 7 is transmitted from the planetary gears 8 to the ring gear 10 and output through the third gear 19 and the fourth gear 22 to the second pump/motor 20 that serves as a pump. The power output to the second pump/motor 20 is transmitted through the hydraulic pipeline 30 to the first pump/motor 16 that serves as a motor. The rotational power of the first pump/motor 16 is output from the output shaft 17 to the sun gear 11 of the second planetary gear train 6 through the second gear 18, the first gear 15, the carrier 9 and the sleeve shaft 23. In this way, the power output to the sun gear 11 of the second planetary gear train 6 is transmitted from the planetary gears 12 to the output shaft 25 through the ring gear 14, the fifth gear 24 and the sixth gear 26 and becomes the rotational power of the output shaft 25.

The first embodiment is associated with a case where the invention is applied to a construction vehicle. In this embodiment, the displacement of the second pump/motor 20 is not set to zero when vehicle speed is zero, in order to allow the output shaft 25 to generate torque to produce traction force even when vehicle speed is zero (see FIG. 2(c)). When vehicle speed is zero, the second pump/motor 20 performs pumping operation because its displacement is not zero, but the first pump/motor 16 does not rotate because of zero vehicle speed, so that all pressure oil is released by the relief valve 49. As vehicle speed increases, the rotational speed of the first pump/motor 16 increases and the released pressure oil decreases gradually. Specifically, in the first embodiment, even when vehicle speed is zero, torque can be generated on the output shaft 25 through the hydraulic transmission section in accordance with the set pressure of the relief valve 49.

As shown in Table 1, in a vehicle speed range B exceeding V2, the first clutch 27 is turned ON to engage the carrier 13 of the second planetary gear train 6 with the ring gear 10 of the first planetary gear train 5, whereas the second clutch 29 is turned OFF to disengage the carrier 13 of the second planetary gear train 6 from the fixed end 28, thereby establishing the compound split mode. That is, the vehicle speed V2 is a mode switching point at which shifting between the input split mode and the output split mode is effected. The vehicle speed V2 is also the low speed side direct point at which the displacement of the first pump/motor 16 is zero and engine power is all transmitted to the output shaft 25 through the mechanical transmission section alone. It should be noted that, at vehicle speed V2, the rotational speed of the second pump/motor 20 is zero and the rotational speed of the ring gear 10 of the first planetary gear train 5 is equal to that of the carrier 13 of the second planetary gear train 6. Therefore, a dog clutch of simple structure can be used as the first clutch 27 and the second clutch 29.

In the vehicle speed range B, the power of the engine 2 is input to the sun gear 7 of the first planetary gear train 5 and this power is output from the carrier 9 to the sun gear 11 of the second planetary gear train 6 through the sleeve shaft 23. The power input to the sun gear 7 is transmitted from the carrier 9 to the first pump/motor 16 that serves as a pump, through the first gear 15 and the second gear 18. The power output to the first pump/motor 16 is then transmitted through the hydraulic pipeline 30 to the second pump/motor 20 that serves as a motor. The rotational power of the second pump/motor 20 is transmitted from its output shaft 21 to the carrier 13 of the second planetary gear train 6 through the fourth gear 22, the third gear 19, and the ring gear 10. In this way, the power output to the sun gear 11 of the second planetary gear train 6 is transmitted to the ring gear 14 through the planetary gears 12, whereas the power output to the carrier 13 of the second planetary gear train 6 is transmitted to the ring gear 14 through the planetary gears 12. These powers are combined at the ring gear 14 and transmitted to the output shaft 25 through the fifth gear 24 and the sixth gear 26, becoming the rotational power of the output shaft 25.

At a vehicle speed V4, the rotational speed of the first pump/motor 16 reaches zero while the displacement of the second pump/motor 20 becomes zero. At that time, the second pump/motor 20 runs idle with the first pump/motor 16 being stopped, and no oil flows in the hydraulic pipeline 30 so that no power is transmitted by oil pressure. Thus, vehicle speed reaches the high speed side direct point at which the power of the engine 2 is all transmitted through the mechanical transmission section alone.

In the transmission system 1 of the first embodiment, shifting between the input split mode and the compound split mode is effected on the basis of the vehicle speed at which the rotational speed of the second pump/motor 20 becomes zero (i.e., the mode switching point). Specifically, if the present vehicle speed is in a vehicle speed range below the mode switching point, the carrier 13 of the second planetary gear train 6 will be disengaged from the ring gear 10 of the first planetary gear train 5 by the first clutch 27, while engaging the carrier 13 of the second planetary gear train 6 with the fixed end 28 by the second clutch 29, whereby the input split mode will be established. In the input split mode in which vehicle speed is zero, the rotational speed of the first pump/motor 16 is zero and the rotational speed of the second pump/motor 20 for a certain input rotational speed is uniquely determined in accordance with the tooth number ratio of the first planetary gear train 5. At the high speed side direct point that provides the compound split mode (i.e., when the rotational speed of the first pump/motor 16 is zero), the rotational speed of the second pump/motor 20 for the certain input rotational speed is uniquely determined in accordance with the tooth number ratio of the first planetary gear train 5. Specifically, as shown in FIG. 2(a), the rotational speed of the second pump/motor 20 becomes −N1 at both zero vehicle speed and the high speed side direct point V4. Thus, the same rotational speed and same rotating direction can be set for the input split mode and the compound split mode. Therefore, whatever vehicle speed the mode switching point is set to, the applicable rotational speed range of the second pump/motor 20 in the input split mode and the applicable rotational speed range of the second pump/motor 20 in the compound split mode can be evenly balanced, so that a pump/motor having smaller capacity than the prior art can be used as the second pump/motor 20. In addition, since the rotating direction in the input split mode does not differ from the rotating direction in the compound split mode, a mono-directional pump/motor can be used as the second pump/motor 20.

Generally, in construction vehicles such as bulldozers and wheel loaders, the vehicles travel at vehicle speeds approximately three to four times the vehicle speeds during construction operation. For instance, in the case of bulldozers, dozing operation is performed at a speed of about 3 km/h whereas their maximum speed is about 11 km/h. In the case of wheel loaders, V-shape loading is performed at a speed of about 10 km/h whereas their maximum speed is about 35 km/h. The low speed side direct point and high speed side direct point are the vehicle speeds at which the best transmission efficiency of the transmission system can be obtained because the power of the engine 2 is all transmitted through the mechanical mechanism at these points. Therefore, in the first embodiment, the mode switching point is set such that the low speed side direct point (vehicle speed V2) corresponds to a vehicle speed for construction operation whereas the high speed side direct point (vehicle speed V4) corresponds to the maximum speed. In other words, the mode switching point is set so as to make the speed ratio (V4/V2) of the high speed side direct point to the low speed side direct point be 3 to 4 (the same is applied to each of the following embodiments). This has the effect of providing highly improved efficiency. In order to attain improved efficiency in cases where the transmission system 1 of the first embodiment is applied to vehicles such as buses and transport trucks which often travel at intermediate and high speeds, the mode switching point is set such that the speed ratio (V4/V2) of the high speed side direct point to the low speed side direct point is 2 or less.

Second Embodiment

Figure 3:
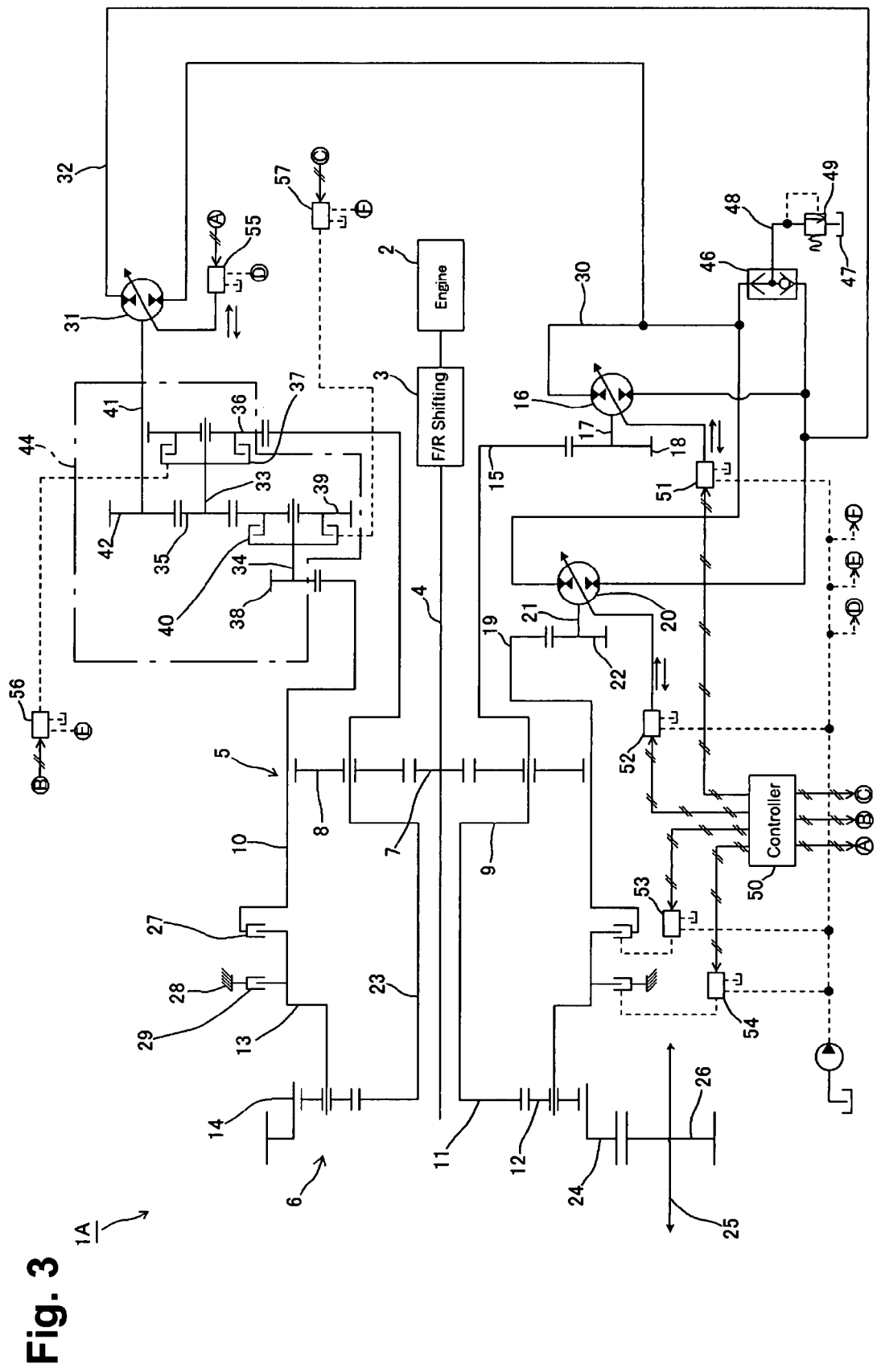
FIG. 3 is a schematic structural diagram of a transmission system according to a second embodiment of the invention.

FIG. 3 is a schematic structural diagram of a transmission system constructed according to a second embodiment of the invention. In the second embodiment, parts substantially similar or corresponding to those of the first embodiment are identified by the same reference numerals and a detailed description thereof is omitted herein.

In the transmission 1A of the second embodiment, a third pump/motor 31 is connected to the hydraulic pipeline 30 through a hydraulic pipeline 32. The third pump/motor 31 is provided with a third pump/motor displacement control system 55 for adjusting the displacement of the third pump/motor 31 in response to an instruction signal from the controller 50. Also, a first shaft 33 and a second shaft 34 are disposed in parallel with the input shaft 4.

A seventh gear 35 is secured to the first shaft 33 and an eighth gear 36 is coupled to the first shaft 33 through a third clutch 37. A ninth gear 38 is secured to the second shaft 34 and a tenth gear 39 is coupled to the second shaft 34 through a fourth clutch 40. Meshingly engaged with the seventh gear 35 are the tenth gear 39 and an eleventh gear 42 that is secured to an output shaft 41 of the third pump/motor 31. A first gear 15 is in meshing engagement with the eight gear 36 and the third gear 19 is in meshing engagement with the ninth gear 38. It should be noted that the gear mechanism 44 (hereinafter referred to as "switching mechanism 44") including the third clutch 37 and the fourth clutch 40 corresponds to the "switching mechanism" of the invention.

The third clutch 37 and the fourth clutch 40 are both hydraulic clutches. The third clutch 37 is equipped with a third clutch pressure control valve 56 for controlling the clutch pressure of the third clutch 37 in response to an instruction signal from the controller 50 whereas the fourth clutch 40 is similarly equipped with a fourth clutch pressure control valve 57 for controlling the clutch pressure of the fourth clutch 40 in response to an instruction signal from the controller 50.

Figure 4:
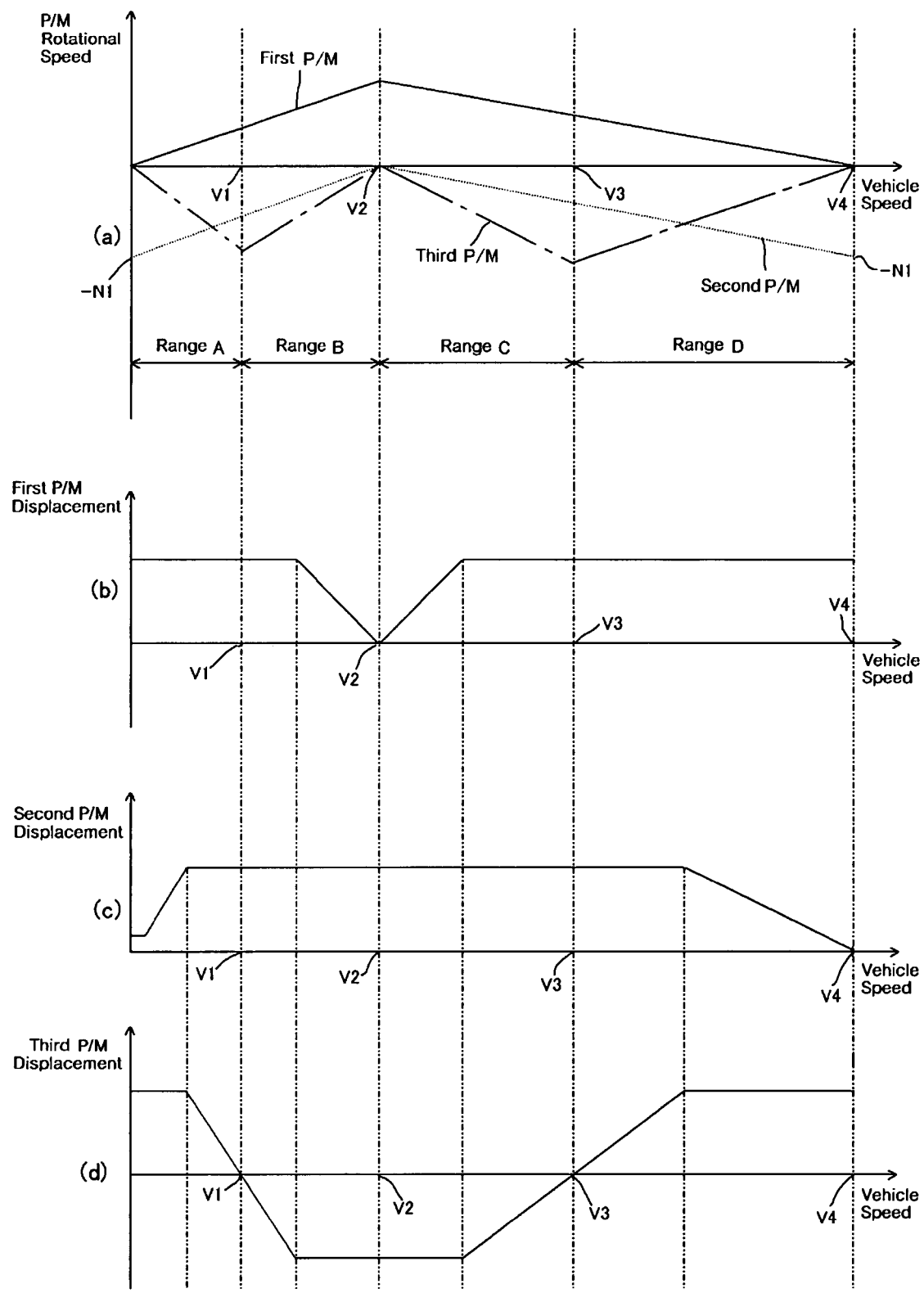
FIG. 4 is operating characteristic graphs of the transmission system according to the second embodiment.
Figure 5:
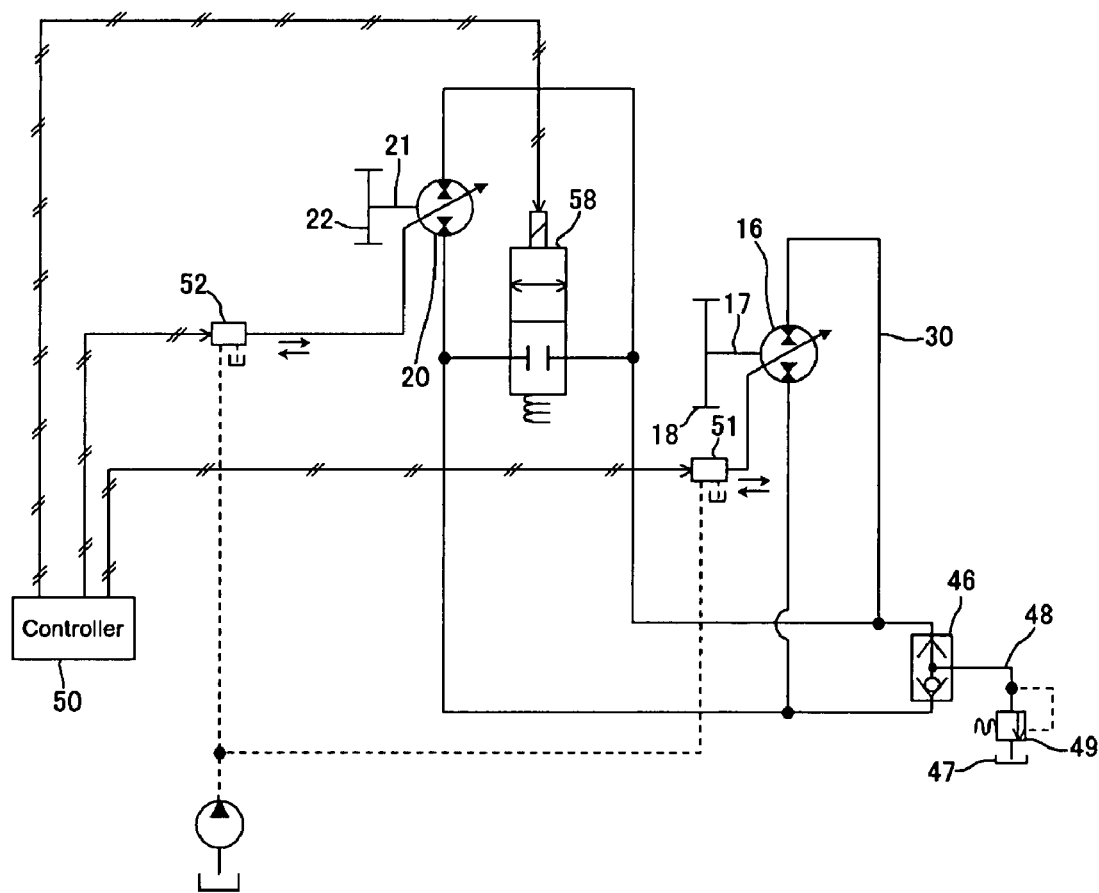
FIG. 5 is a diagram illustrating an embodiment in which a hydraulic circuit is provided with a communication valve.

Reference is made to FIG. 4 and Table 2 to describe a case where vehicle speed is accelerated from zero while keeping the input rotational speed transmitted from the engine 2 to the input shaft 4 constant in the transmission system 1A of the second embodiment. FIG. 4 shows operating characteristic graphs of the transmission system of this embodiment. Specifically, FIG. 4(*a*) is a graph showing changes in the rotational speed of each pump/motor relative to vehicle speed; FIG. 4(*b*) is a graph showing changes in the displacement of the first pump/motor relative to vehicle speed; and FIG. 4(*c*) is a graph showing changes in the displacement of the second pump/motor relative to vehicle speed; and FIG. 4(*d*) is a graph showing changes in the displacement of the third pump/motor relative to vehicle speed. Table 2 shows the operating condition (ON (connected)/OFF (disconnected) state) of each clutch in relation to vehicle speed ranges. In FIG. 4(*a*), solid line, dotted line, alternate long and short dash line represent changes in the rotational speeds of the first, second and third pumps/motors, respectively, relative to vehicle speed.

TABLE 2

|  | Vehicle Speed Range A | Vehicle Speed Range B | Vehicle Speed Range C | Vehicle Speed Range D |
| --- | --- | --- | --- | --- |
| First Clutch | OFF | OFF | ON | ON |
| Second Clutch | ON | ON | OFF | OFF |
| Third Clutch | ON | OFF | OFF | ON |
| Fourth Clutch | OFF | ON | ON | OFF |

As shown in FIGS. 4(*b*), 4(*c*), 4(*d*), the displacements of the pumps/motors 16, 20, 31 are controlled by the pump/motor displacement control systems 51, 52, 55 respectively in response to instruction signals from the controller 50 according to vehicle speeds. As a result, the rotational speeds of the pumps/motors 16, 20, 31 vary as shown in FIG. 4(*a*). At the vehicle speed V2 at which the displacement of the first pump/motor 16 reaches zero and the vehicle speeds V1, V3 at which the displacement of the third pump/motor 31 reaches zero, the clutches 27, 29, 37, 40 are switched as shown in TABLE 1 by the clutch pressure control valves 53, 54, 56, 57 that operate in response to instruction signals from the controller 50.

First, in the initial state where vehicle speed is zero, the first clutch 27 is turned OFF as shown in Table 2 to disengage the carrier 13 of the second planetary gear train 6 from the ring gear 10 of the first planetary gear train 5, whereas the second clutch 29 is turned ON as shown in Table 2 to bring the carrier 13 of the second planetary gear train 6 into engagement with the fixed end 28, so that the input split mode is established. In the above initial state, vehicle speed is equal to or lower than V1 and therefore the third clutch 37 is turned ON and the fourth clutch 40 is turned OFF as shown in TABLE 2, so that the third pump/motor 31 is connected to the first pump/motor 16 in parallel (range A).

In the range A, the power of the engine 2 is input to the sun gear 7 of the first planetary gear train 5 and this power is output from the carrier 9 to the sun gear 11 of the second planetary gear train 6 through the sleeve shaft 23. The power input to the sun gear 7 is transmitted from the planetary gears 8 to the ring gear 10 and then output to the second pump/motor 20 that serves as a pump, through the third gear 19 and the fourth gear 22. The power output to the second pump/motor 20 is transmitted through the hydraulic pipeline 30 to the first pump/motor 16 that serves as a motor and transmitted through the hydraulic pipeline 32 to the third pump/motor 31 that serves as a motor. Further, the rotational power of the first pump/motor 16 is output from its output shaft 17 to the sun gear 11 of the second planetary gear train 6 through the second gear 18, the first gear 15, the carrier 9 and the sleeve shaft 23. The rotational power of the third pump/motor 31 is output from its output shaft 41 to the sun gear 11 of the second planetary gear train 6 through the eleventh gear 42, the seventh gear 35, the first shaft 33, the eighth gear 36, the first gear 15, the carrier 9 and the sleeve shaft 23. In this way, the power output to the sun gear 11 of the second planetary gear train 6 is transmitted from the planetary gears 12 to the output shaft 25 through the ring gear 14, the fifth gear 24 and the sixth gear 26 and becomes the rotational power of the output shaft 25. The third pump/motor 31 connected to the first pump/motor 16 in parallel plays the role of assisting the motoring function of the first pump/motor 16.

It should be noted that the second embodiment has been described in the context of the transmission system 1A that is applied to a construction vehicle. Therefore, the second embodiment is designed, similarly to the first embodiment, such that the displacement of the second pump/motor 20 during the initial state where vehicle speed is zero is not set to zero in order to obtain traction force by generating torque on the output shaft 25 even when vehicle speed is zero (see FIG. 4(*c*)). A detained explanation will be skipped herein because the second embodiment is similar to the first embodiment in this respect.

As shown in Table 2, in the vehicle speed range B exceeding V1, the third clutch 37 is turned OFF and the fourth clutch 40 is turned ON so that the third pump/motor 31 is connected to the second pump/motor 20 in parallel. In doing so, the displacement of the third pump/motor 31 is zero at the instant when vehicle speed changes from the range A to V1. At the same time, the teeth numbers of the gears to be connected to the first to third pumps/motors 16, 20, 31 are properly determined, whereby the relative rotational speed difference between the tenth gear 39 and the second shaft 34 in this condition, that is, the relative rotational speed difference of the fourth clutch 40 in the idle condition can be made to be zero. However, the third pump/motor 31 and the eleventh gear 42, seventh gear 35 and tenth gear 39 which are connected to the third pump/motor 31 start to decrease in speed owing to their own friction or the like because the driving force for rotating the third pump/motor 31 is cut off on and after the instant when vehicle speed reaches V1 and the third clutch 37 is turned OFF. As a result, when turning the fourth clutch 400N to connect the third pump/motor 31 to the second pump/motor 20 in parallel, a relative rotational speed difference occurs between the tenth gear 39 and the second shaft 34. As a clutch mechanism for absorbing such a rotational speed difference, hydraulic multiple disc clutches or synchromesh mechanisms, which are simpler in structure and less costly than hydraulic multiple disc clutches, may be employed. In addition, in cases where the rotational speed difference between the gear 39 and the shaft 34 can be made to be zero by the technique described later, dog clutches that are much simpler in structure can be employed.

In the range B, the power of the engine 2 is input to the sun gear 7 of the first planetary gear train 5 and this power is output from the carrier 9 to the sun gear 11 of the second planetary gear train 6 through the sleeve shaft 23. The power input to the sun gear 7 is output from the planetary gears 8 to the third gear 19 through the ring gear 10. The power output to the third gear 19 is output through the fourth gear 22 to the second pump/motor 20 that serves as a pump and output through the ninth gear 38, the second shaft 34, the tenth gear 39, the seventh gear 35 and the eleventh gear 42 to the third pump/motor 31 that serves as a pump. The power output to the second pump/motor 20 and the power output to the third pump/motor 31 are transmitted to the first pump/motor 16 through the hydraulic pipelines 30 and 32, respectively. The rotational power of the first pump/motor 16 is output from its output shaft 17 to the sun gear 11 of the second planetary gear train 6 through the second gear 18, the first gear 15, the carrier 9 and the sleeve shaft 23. In this way, the power output to the sun gear 11 of the second planetary gear train 6 is transmitted from the planetary gears 12 to the output shaft 25 through the ring gear 14, the fifth gear 24 and the sixth gear 26 and becomes the rotational power of the output shaft 25. In the range B, the third pump/motor 31 accordingly plays the role of assisting the pumping function of the second pump/motor 20. In the range B, only the object which the third pump/motor 31 assists differs from that of the range A but the mode of the transmission system remains in the input split mode.

As shown in Table 2, in a vehicle speed range C exceeding V2, the first clutch 27 is turned ON to engage the carrier 13 of the second planetary gear train 6 with the ring gear 10 of the first planetary gear train 5 whereas the second clutch 29 is turned OFF to disengage the carrier 13 of the second planetary gear train 6 from the fixed end 28, so that the compound split mode is established. That is, the vehicle speed V2 is the mode switching point at which shifting between the input split mode and the compound split mode is effected. The vehicle speed V2 is also the low speed side direct point at which the displacement of the first pump/motor 16 becomes zero and the power of the engine is all transmitted to the output shaft 25 through the mechanical transmission section alone. In the second embodiment, at the vehicle speed V2, the rotational speeds of the second pump/motor 20 and the third pump/motor 31 are both zero and the rotational speed of the ring gear 10 of the first planetary gear train 5 is equal to the rotational speed of the carrier 13 of the second planetary gear train 6 irrespective of the states of the third clutch 37 and the fourth clutch 40. Therefore, a dog clutch simple in structure can be used as the first clutch 27 and the second clutch 29.

In the range C, the power of the engine 2 is input to the sun gear 7 of the first planetary gear train 5 and this power is output from the carrier 9 to the sun gear 11 of the second planetary gear train 6 through the sleeve shaft 23. The power input to the sun gear 7 is also output from the carrier 9 to the first pump/motor 16 that serves as a pump, through the first gear 15 and the second gear 18. The power output to the first pump/motor 16 is then transmitted through the hydraulic pipeline 30 to the second pump/motor 20 that serves as a motor and transmitted through the hydraulic pipeline 32 to the third pump/motor 31 that serves as a motor. The rotational power of the second pump/motor 20 is output from its output shaft 21 to the carrier 13 of the second planetary gear train 6 through the fourth gear 22, the third gear 19 and the ring gear 10, whereas the rotational power of the third pump/motor 31 is output from its output shaft 41 to the carrier 13 of the second planetary gear train 6 through the eleventh gear 42, the seventh gear 35, the tenth gear 39, the second shaft 34, the ninth gear 38, the third gear 19 and the ring gear 10. The power output to the sun gear 11 of the second planetary gear train 6 is output to the ring gear 14 through the planetary gears 12, whereas the power output to the carrier 13 of the second planetary gear train 6 is output to the ring gear 14 through the planetary gears 12. These powers join together at the ring gear 14 to be transmitted to the output shaft 25 through the fifth gear 24 and the sixth gear 26 and thus become the rotational power of the output shaft 25. In the range C, the third pump/motor 31 plays the role of assisting the second pump/motor 20 in performing its motoring function continuously from the range B.

As shown in Table 2, in a vehicle speed range D exceeding V3, the third clutch 37 is turned ON and the fourth clutch 40 is turned OFF, thereby connecting the third pump/motor 31 to the first pump/motor 16 in parallel. In so doing, at the instant when vehicle speed changes from the range C to V3, the displacement of the third pump/motor 31 is zero. At the same time, the teeth numbers of the gears connected to the first to third pumps/motors 16, 20, 31 are properly determined, thereby making the relative rotational speed difference between the tenth gear 39 and the second shaft 34 in this condition, i.e., the relative rotational speed difference of the fourth clutch 40 in the idle condition be zero. However, the third pump/motor 31 and the eleventh gear 42, seventh gear 35 and tenth gear 39 which are connected to the third pump/motor 31 start to decrease in speed owing to their own friction or the like because the driving force for rotating the third pump/motor 31 is cut off on and after the instant when vehicle speed reaches V3 and the fourth clutch 40 is turned OFF. As a result, when turning the third clutch 370N to connect the third pump/motor 31 to the first pump/motor 16 in parallel, a relative rotational speed difference occurs between the eighth gear 36 and the first shaft 33. As a clutch mechanism for absorbing such a rotational speed difference, hydraulic multiple disc clutches or synchromesh mechanisms that are simpler in structure and less costly than hydraulic multiple disc clutches may be employed. In addition, in cases where the rotational speed difference between the gear 36 and the shaft 33 can be made to be zero by the technique described later, dog clutches that are much simpler in structure can be employed.

In the range D, the power of the engine 2 is input to the sun gear 7 of the first planetary gear train 5 and this power is output from the planetary gears 8 to the carrier 13 of the second planetary gear train 6 through the ring gear 10. The power input to the sun gear 7 is output to the carrier 9 and the power output to the carrier 9 is then output through the sleeve shaft 23 to the sun gear 11 of the second planetary gear train 6 and to the first gear 15. The power output to the first gear 15 is output through the second gear 18 to the first pump/motor 16 that serves as a pump and is also output through the eighth gear 36, the first shaft 33, the seventh gear 35 and the eleventh gear 42 to the third pump/motor 31 that serves as a pump. The power output to the first pump/motor 16 and the power output to the third pump/motor 31 are then transmitted to the second pump/motor 20 that serves as a motor, through the hydraulic pipeline 30 and the hydraulic pipeline 32, respectively. The rotational power of the second pump/motor 20 is output from its output shaft 21 to the carrier 13 of the second planetary gear train 6 through the fourth gear 22, the third gear 19 and the ring gear 10. In this way, the power output to the sun gear 11 of the second planetary gear train 6 is output to the ring gear 14 through the planetary gears 12, and the power output to the carrier 13 of the second planetary gear train 6 is also output to the ring gear 14 through the planetary gears 12. These powers join together at the ring gear 14 to be output to the output shaft 25 through the fifth gear 24 and the sixth gear 26 and accordingly become the rotational power of the output shaft 25. In the range D, the third pump/motor 31 accordingly plays the role of assisting the pumping function of the first pump/motor 16. In the range D, only the object which the third pump/motor 31 assists differs from that of the range C but the mode of the transmission system remains in the compound split mode.

At the vehicle speed V4, the rotational speeds of the first pump/motor 16 and the third pump/motor 31 reach zero and the displacement of the second pump/motor 20 becomes zero. At that time, the first pump/motor 16 and the third pump/motor 31 are brought into a stopped state and the second pump/motor 20 runs idle so that no oil flows in the hydraulic pipelines 30, 32, causing no hydraulic power transmission. As a result, vehicle speed becomes the high speed side direct point at which the power of the engine 2 is all transmitted through the mechanical transmission section alone.

The transmission system 1A of the second embodiment has the same operational effect as of the transmission system 1 of the first embodiment since they have the same basic configuration. According to the transmission system 1A of the second embodiment, the third pump/motor 31 can be selectively placed on the first pump/motor 16 side or the second pump/motor 20 side whereby the pump/motor 31 can be used for assisting the function of either pump/motor 16 or 20. This allows use of pumps/motors of smaller capacity as the pumps/motors 16, 20, 31. Herein, it is desirable to set the displacement capacities of the first pump/motor 16, the second pump/motor 20 and the third pump/motor 31 to substantially the same value. This makes it possible to employ pumps/motors having substantially the same specification for them and therefore achieve improved interchangeability.

Provision of the state in which the third clutch 37 and the fourth clutch 40 are turned ON at the same time when shifting the third pump/motor 31 from one side to the other according to the vehicle speeds V1, V3 allows the vehicle speeds V1, V3 to be a direct point at which engine power is all transmitted through the mechanical transmission section only. In this case, four direct points can be provided in total, including the above-described low speed side direct point (=the mode switching point) and high speed side direct point.

Next, there will be explained the operation of a switching mechanism 44 during acceleration from a low vehicle speed to a high vehicle speed, by way of an example in which vehicle speed changes from V1 to the above direct state. When vehicle speed is lower than V1, the third pump/motor 31 is connected to the first pump/motor 16 in parallel. That is, the third clutch 37 is ON whereas the fourth clutch 40 is OFF. The vehicle is accelerated from this condition and at the instant when vehicle speed has reached V1, the relative rotational speed of the fourth clutch 40 in its OFF state, that is, the relative rotational speed difference between the ninth gear 38 and the tenth gear 39 becomes nil. Specifically, at the moment when vehicle speed has reached V1 from a lower speed, the fourth clutch 40 can be engaged in a condition where no relative rotational speed difference exists. Therefore, dog clutches that are simpler in structure and less costly than hydraulic multiple disc clutches and synchromesh mechanisms may be employed for the third clutch 37 and the fourth clutch 40. In addition, if the vehicle is driven at a direct point, the hydraulic pipeline 30, which connects the first pump/motor 16 to the second pump/motor 20, is brought into a communicating state by means of a communicating valve 58 provided in the hydraulic pipeline 30. This enables it to completely cut off the power transmission by oil pressure so that the power loss in the hydraulic path can be minimized and the efficiency of the transmission system can be increased.

Third Embodiment

Figure 6:
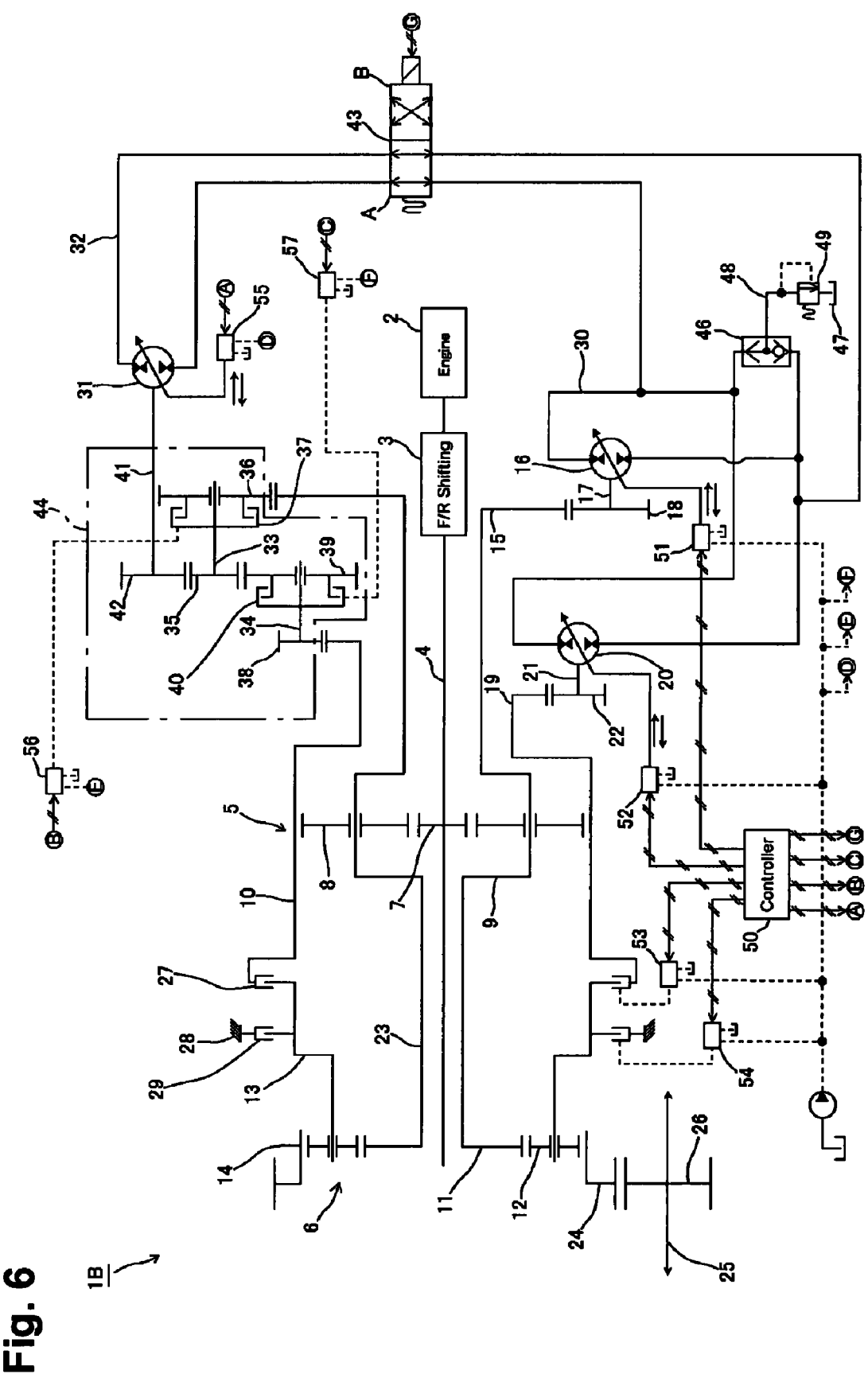
FIG. 6 is a schematic structural diagram of a transmission system according to a third embodiment of the invention.
Figure 7:
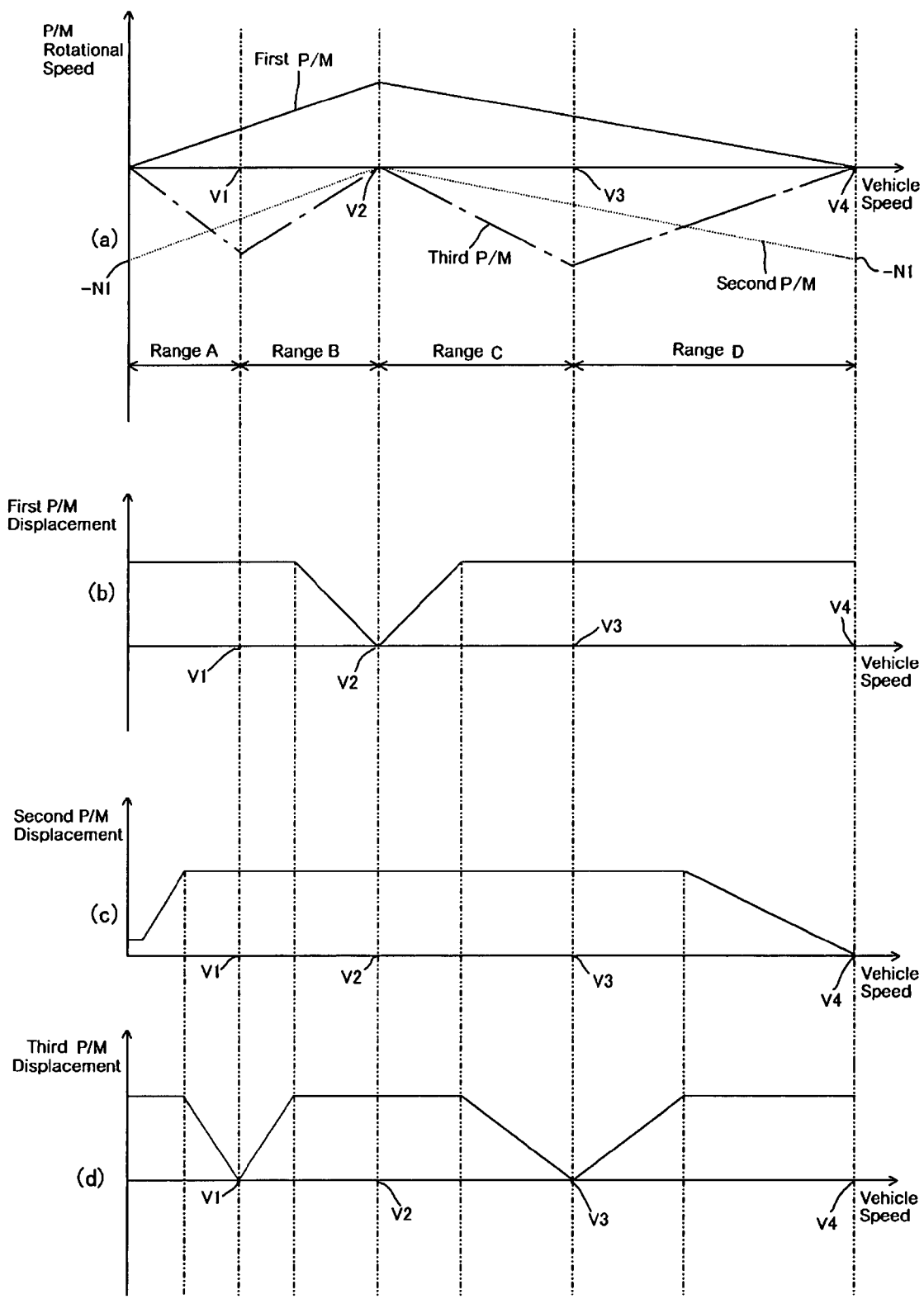
FIG. 7 is operating characteristic graphs of the transmission system according to the third embodiment.

FIG. 6 is a schematic structural diagram of a transmission system according to a third embodiment of the invention. FIG. 7 shows operating characteristic graphs of the transmission system according to the third embodiment. The third embodiment is associated with an example where the transmission system 1A of the second embodiment is additionally provided with a switching valve 43 for effecting switching such that the flow of pressure oil to the third pump/motor 31 is constantly directed in a fixed direction. Therefore, parts similar or corresponding to those of the second embodiment are identified with the same reference numerals and a detailed description thereof is omitted herein.

The third embodiment provides a transmission system 1B characterized by a mono-directional pump/motor used as the third pump/motor 31 (see FIG. 7(d)). In some cases, the rotating direction of the third pump/motor 31 when connected to the first pump/motor 16 side is opposite to that of the third pump/motor 31 when connected to the second pump/motor 20 side. Therefore, the transmission system 1A of the second embodiment has to use a bi-directional pump/motor as the third pump/motor 31 (see FIG. 4(d)). In contrast with this, the third embodiment can use a mono-directional pump/motor as the third pump/motor 31 and attain cost reduction, by employing such a configuration that the switching valve 43 is provided in the hydraulic pipeline 32 and shifted between positions A and B in accordance with whether the third pump/motor 31 is connected to the first pump/motor 16 side or the second pump/motor 20 side.

Fourth Embodiment

Figure 8:
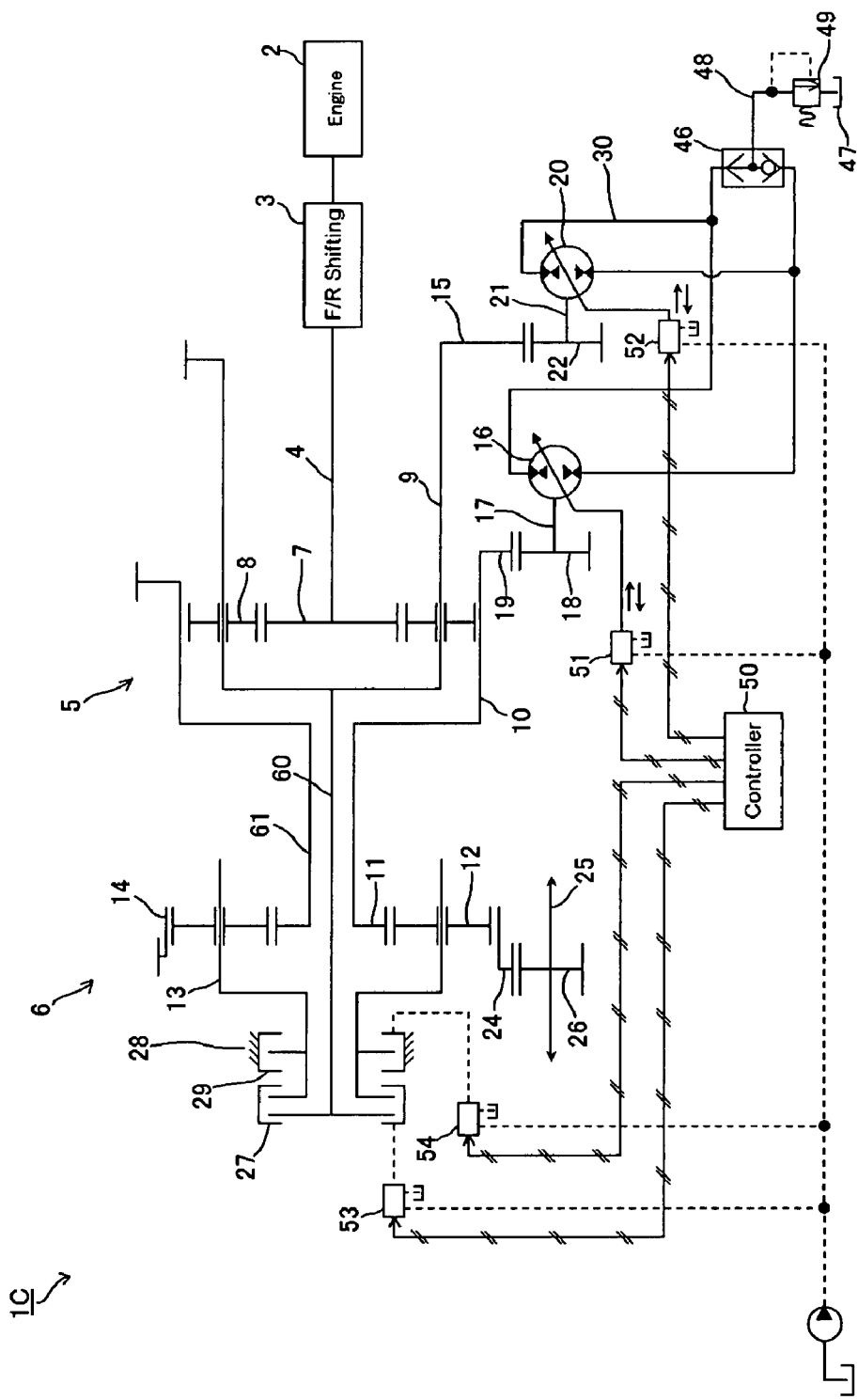
FIG. 8 is a schematic structural diagram of a transmission system according to a fourth embodiment of the invention.

FIG. 8 is a schematic structural diagram of a transmission system according to a fourth embodiment of the invention. In this embodiment, parts similar or corresponding to those of the first embodiment are identified with the same reference numerals and a detailed description thereof is omitted herein.

The fourth embodiment provides a transmission system 1C having the input shaft 4 that inputs power from the engine 2 through the forward/reverse switching mechanism 3 and the first planetary gear train 5 and second planetary gear train 6 that are coaxially aligned on the input shaft 4.

The first planetary gear train 5 is composed of the sun gear secured to the input shaft 4; the plurality of planetary gears 8 in meshing engagement with the outer periphery of the sun gear 7; the carrier 9 for supporting the shaft of the planetary gears 8; and the ring gear 10 in meshing engagement with the outer periphery of the group of the planetary gears 8. The second planetary gear train 6 is composed of the sun gear 11; the plurality of planetary gears 12 in meshing engagement with the outer periphery of the sun gear 11; the carrier 13 for supporting the shaft of the planetary gears 12; and the ring gear 14 in meshing engagement with the outer periphery of the group of planetary gears 12.

The first gear 15 is integrally coupled to the carrier 9 of the first planetary gear train 5 and meshingly engaged with the fourth gear 22 secured to the output shaft 21 of the second pump/motor 20. The third gear 19 is integrally coupled to the ring gear 10 of the first planetary gear train 5 and meshingly engaged with the second gear 18 secured to the output shaft 17 of the first pump/motor 16. The ring gear 10 of the first planetary gear train 5 and the sun gear 11 of the second planetary gear train 6 are coupled to each other by a sleeve shaft 61 that is rotatably supported on an intermediate output shaft 60. The fifth gear 24 is integrally coupled to the ring gear 14 of the second planetary gear train 6 and meshingly engaged with the sixth gear 26 secured to the output shaft 25 of the fifth gear 24.

The transmission system 1C is provided with the first clutch 27 for connecting and disconnecting the carrier 13 of the second planetary gear train 6 to and from the carrier 9 of the first planetary gear train 5 through the intermediate output shaft 60 and provided with the second clutch 29 for connecting and disconnecting the carrier 13 of the second planetary gear train 6 to and from the fixed end 28.

Figure 9:
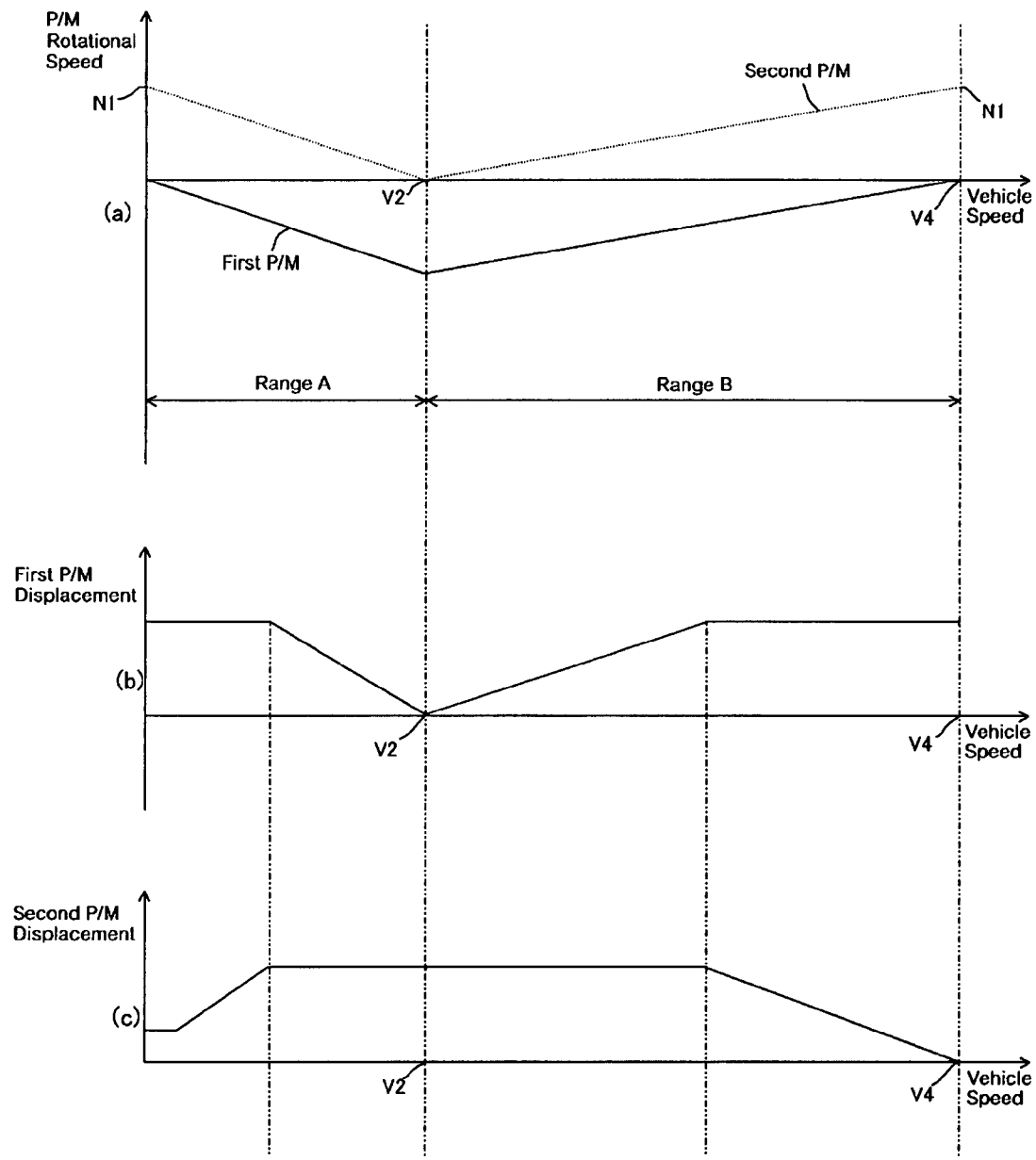
FIG. 9 is operating characteristic graphs of the transmission system according to the fourth embodiment.

Reference is made to FIG. 9 and Table 3 to describe a case where vehicle speed is accelerated from zero while keeping the rotational speed of the engine 2 input to the input shaft 4 constant in the transmission system 1C of the fourth embodiment. FIG. 9 shows operating characteristic graphs of the transmission system of the fourth embodiment. FIG. 9(*a*) is a graph showing changes in the rotational speed of each pump/motor relative to vehicle speed; FIG. 9(*b*) is a graph showing changes in the displacement of the first pump/motor relative to vehicle speed; and FIG. 9(*c*) is a graph showing changes in the displacement of the second pump/motor relative to vehicle speed. Table 3 shows the operating condition (ON (connected)/OFF (disconnected) state) of each clutch in relation to vehicle speed ranges. In FIG. 9(*a*), solid line represents changes in the rotational speed of the first pump/motor relative to vehicle speed whereas dotted line represents changes in the rotational speed of the second pump/motor relative to vehicle speed.

TABLE 3

|  | Vehicle Speed Range A | Vehicle Speed Range B |
| --- | --- | --- |
| First Clutch | OFF | ON |
| Second Clutch | ON | OFF |

The displacements of the pumps/motors 16, 20 are controlled according to vehicle speed as shown in FIGS. 9(*b*), 9(*c*), by means of the first and second pump/motor displacement control systems 51, 52, respectively, that operate in response to instruction signals from the controller 50. As a result, the rotational speeds of the pumps/motors 16, 20 vary as shown in FIG. 9(*a*). At the vehicle speed V2 which serves as the switching point and at which the displacement of the first pump/motor 16 becomes zero, the first and second clutches 27, 29 are switched as shown in Table 3 by the first and second clutch pressure control valves 53, 54, respectively, that operate in response to instruction signals from the controller 50.

As shown in Table 3, in the vehicle speed range A not higher than the vehicle speed V2, the first clutch 27 is turned OFF to disengage the carrier 13 of the second planetary gear train 6 from the carrier 9 of the first planetary gear train 5, whereas the second clutch 29 is turned ON to engage the carrier 13 of the second planetary gear train 6 with the fixed end 28, thereby establishing the input split mode. At that time, the power of the engine 2 is input to the sun gear 7 of the first planetary gear train 5 and this power is transmitted from the planetary gears 8 to the ring gear 10 and output to the sun gear 11 of the second planetary gear train 6 through the sleeve shaft 61. The power input to the sun gear 7 is transmitted from the carrier 9 to the second pump/motor 20 that serves as a pump, through the first gear 15 and the fourth gear 22. The power output to the second pump/motor 20 is transmitted through the hydraulic pipeline 30 to the first pump/motor 16 that serves as a motor. The rotational power of the first pump/motor 16 is output from the output shaft 17 to the sun gear 11 of the second planetary gear train 6 through the second gear 18, the third gear 19, the ring gear 10 and the sleeve shaft 61. In this way, the power output to the sun gear 11 of the second planetary gear train 6 is transmitted from the planetary gears 12 to the output shaft 25 through the ring gear 14, the fifth gear 24 and the sixth gear 26 and becomes the rotational power of the output shaft 25.

The fourth embodiment has been described in the context of the transmission system C applied to a construction vehicle. Similarly to the first embodiment, the displacement of the second pump/motor 20 is not set to zero in the initial state in which vehicle speed is zero, in order to allow the output shaft 25 to generate torque to produce traction force even when vehicle speed is zero (see FIG. 9(*c*)). A detailed explanation will be skipped because the fourth embodiment does not differ from the first embodiment in this respect.

As shown in Table 3, in the vehicle speed range B exceeding V2, the first clutch 27 is turned ON to engage the carrier 13 of the second planetary gear train 6 with the carrier 9 of the first planetary gear train 5, whereas the second clutch 29 is turned OFF to disengage the carrier 13 of the second planetary gear train 6 from the fixed end 28, thereby establishing the compound split mode. That is, the vehicle speed V2 is the mode switching point at which shifting between the input split mode and the output split mode is effected. The vehicle speed V2 is also the low speed side direct point at which the displacement of the first pump/motor 16 is zero and engine power is all transmitted to the output shaft 25 through the mechanical transmission section alone. At the vehicle speed V2, the rotational speed of the second pump/motor 20 is zero and the rotational speed of the carrier 9 of the first planetary gear train 5 is equal to that of the carrier 13 of the second planetary gear train 6. Therefore, dog clutches of simple structure can be used for the first clutch 27 and the second clutch 29.

In the vehicle speed range B, the power of the engine 2 is input to the sun gear 7 of the first planetary gear train 5 and this power is output from the planetary gears 8 to the ring gear 10. The power transmitted to the ring gear 10 is output to the sun gear 11 of the second planetary gear train 6 through the sleeve shaft 61 and output to the first pump/motor 16 that serves as a pump, through the third gear 19 and the second gear 18. The power output to the first pump/motor 16 is then transmitted through the hydraulic pipeline 30 to the second pump/motor 20 that serves as a motor. The rotational power of the second pump/motor 20 is transmitted from its output shaft 21 to the carrier 13 of the second planetary gear train 6 through the fourth gear 22, the first gear 15, the carrier 9 and the intermediate output shaft 60. In this way, the power output to the sun gear 11 of the second planetary gear train 6 is output to the ring gear 14 through the planetary gears 12, and the power output to the carrier 13 of the second planetary gear train 6 is also output to the ring gear 14 through the planetary gears 12. These powers join together at the ring gear 14 to be transmitted to the output shaft 25 through the fifth gear 24 and the sixth gear 26 and become the rotational power of the output shaft 25.

At the vehicle speed V4, the rotational speed of the first pump/motor 16 reaches zero while the displacement of the second pump/motor 20 becomes zero. At that time, the second pump/motor 20 runs idle with the first pump/motor 16 being stopped, and no oils flow in the hydraulic pipeline 30 so that no power is transmitted by oil pressure. Thus, vehicle speed becomes the high speed side direct point at which the power of the engine 2 is all transmitted through the mechanical transmission section alone.

In the transmission system 1C of the fourth embodiment, shifting between the input split mode and the compound split mode is effected on the basis of the vehicle speed (V2: mode switching point) at which the rotational speed of the second pump/motor becomes zero. Specifically, if present vehicle speed is in a vehicle speed range below the mode switching point, the carrier 13 of the second planetary gear train 6 is disengaged from the carrier 9 of the first planetary gear train 5 by the first clutch 27, while engaging the carrier 13 of the second planetary gear train 6 with the fixed end 28 by the second clutch 29, whereby the input split mode is established. In the input split mode in which vehicle speed is zero, the rotational speed of the first pump/motor 16 is zero and the rotational speed of the second pump/motor 20 at a certain input rotational speed is uniquely determined in accordance with the tooth number ratio of the first planetary gear train 5. At the high speed side direct point that provides the compound split mode (i.e., when the rotational speed of the first pump/motor 16 is zero), the rotational speed of the second pump/motor 20 at the certain input rotational speed is uniquely determined in accordance with the tooth number ratio of the first planetary gear train 5. Specifically, as shown in FIG. 9(a), the rotational speed of the second pump/motor 20 becomes +N1 at both zero vehicle speed and the high speed side direct point V4. Thus, the same rotational speed and same rotating direction can be set for these modes. Therefore, whatever vehicle speed the mode switching point is set to, the applicable rotational speed range of the second pump/motor 20 in the input split mode and the applicable rotational speed range of the second pump/motor 20 in the compound split mode can be evenly balanced, so that a pump/motor having smaller capacity than the prior art can be used as the second pump/motor 20. In addition, since the rotating direction in the input split mode does not differ from the rotating direction in the compound split mode, a mono-directional pump/motor can be used as the second pump/motor 20.

Fifth Embodiment

Figure 10:
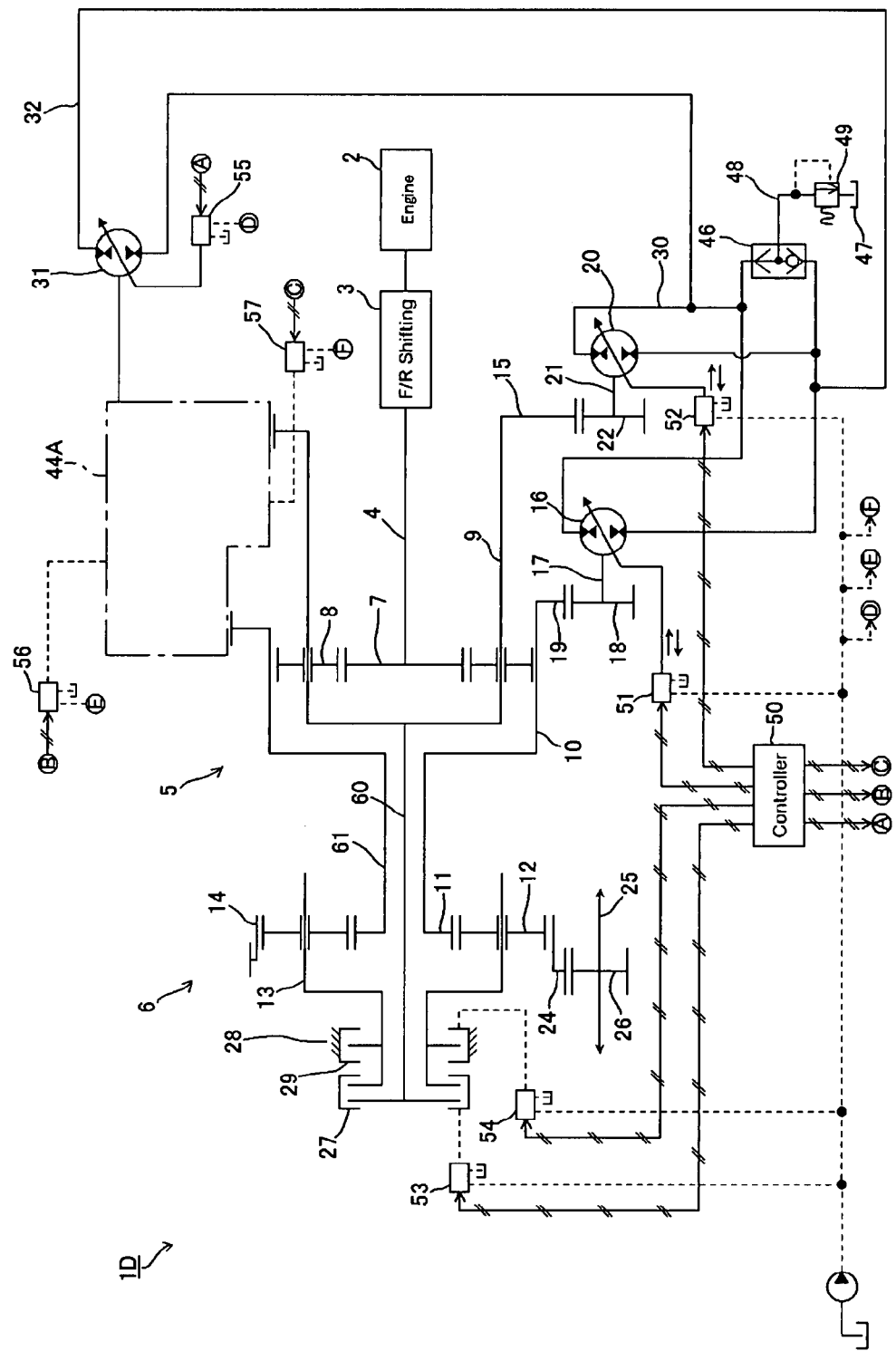
FIG. 10 is a schematic structural diagram of a transmission system according to a fifth embodiment of the invention.

FIG. 10 is a schematic structural diagram of a transmission system according to a fifth embodiment of the invention. The transmission system 1D shown in FIG. 10 is configured to have the third pump/motor 31 that is connected to the transmission system 1C of the fourth embodiment through a switching mechanism 44A (that is basically the same as the switching mechanism 44). This third pump/motor 31 is connected to the hydraulic pipeline 30 through the hydraulic pipeline 32 such that it can be selectively connected to the first pump/motor 16 side or to the second pump/motor 20 side. In this way, the third pump/motor 31 is designed to play the role of assisting the function of either the pump/motor 16 or the pump/motor 20 at any time. According to the fifth embodiment, pumps/motors having smaller capacity can be used as the pumps/motors 16, 20, 31 like the second embodiment.

Sixth Embodiment

Figure 11:
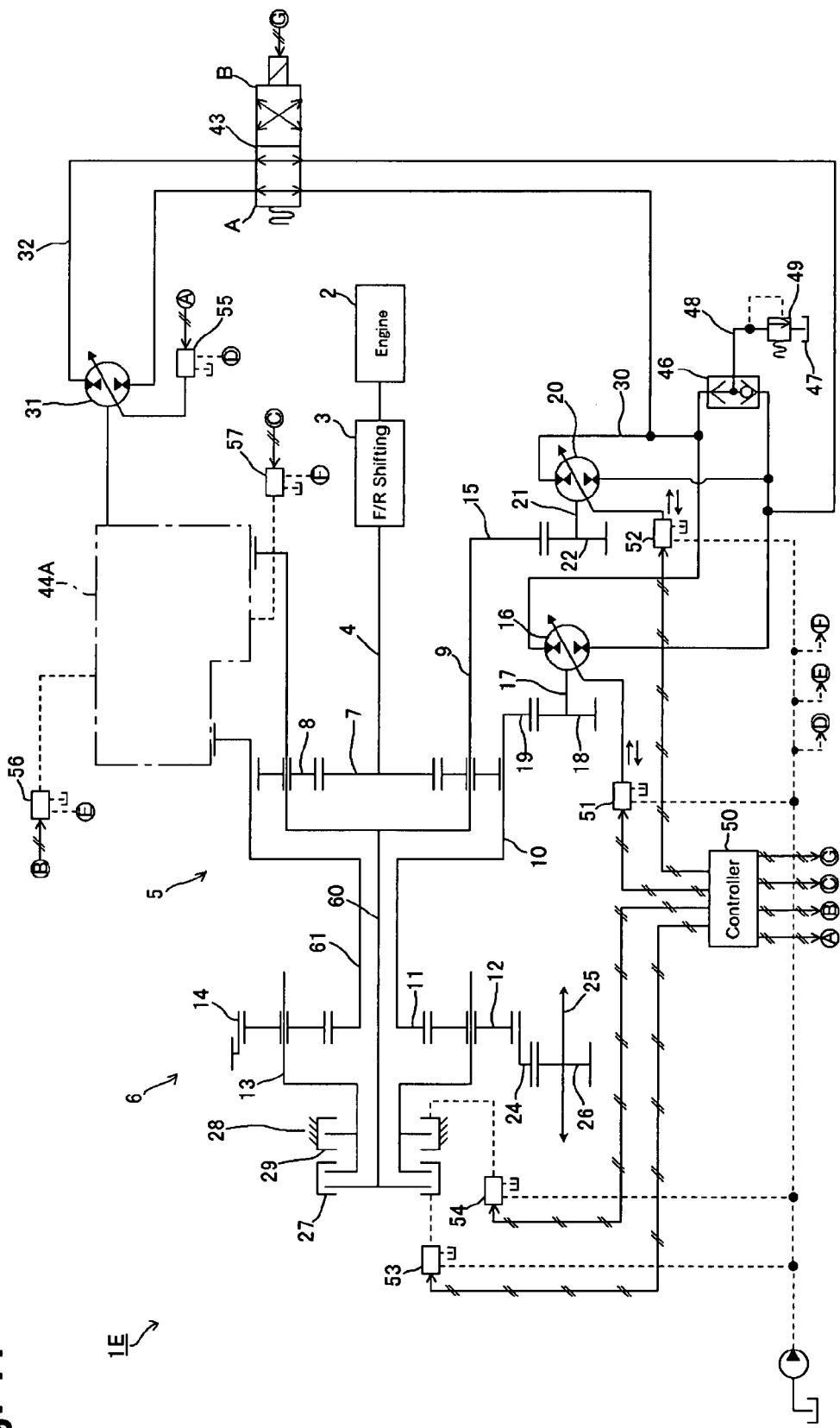
FIG. 11 is a schematic structural diagram of a transmission system according to a sixth embodiment of the invention.

FIG. 11 is a schematic structural diagram of a transmission system according to a sixth embodiment of the invention. The transmission system 1E shown in FIG. 11 is a modification of the transmission system 1D of the fifth embodiment, in which the switching valve 43 is provided in the hydraulic pipeline 32 to thereby enable use of a mono-directional pump/motor as the third pump/motor 31. The sixth embodiment achieves further cost reduction like the third embodiment.

Seventh Embodiment

Figure 12:
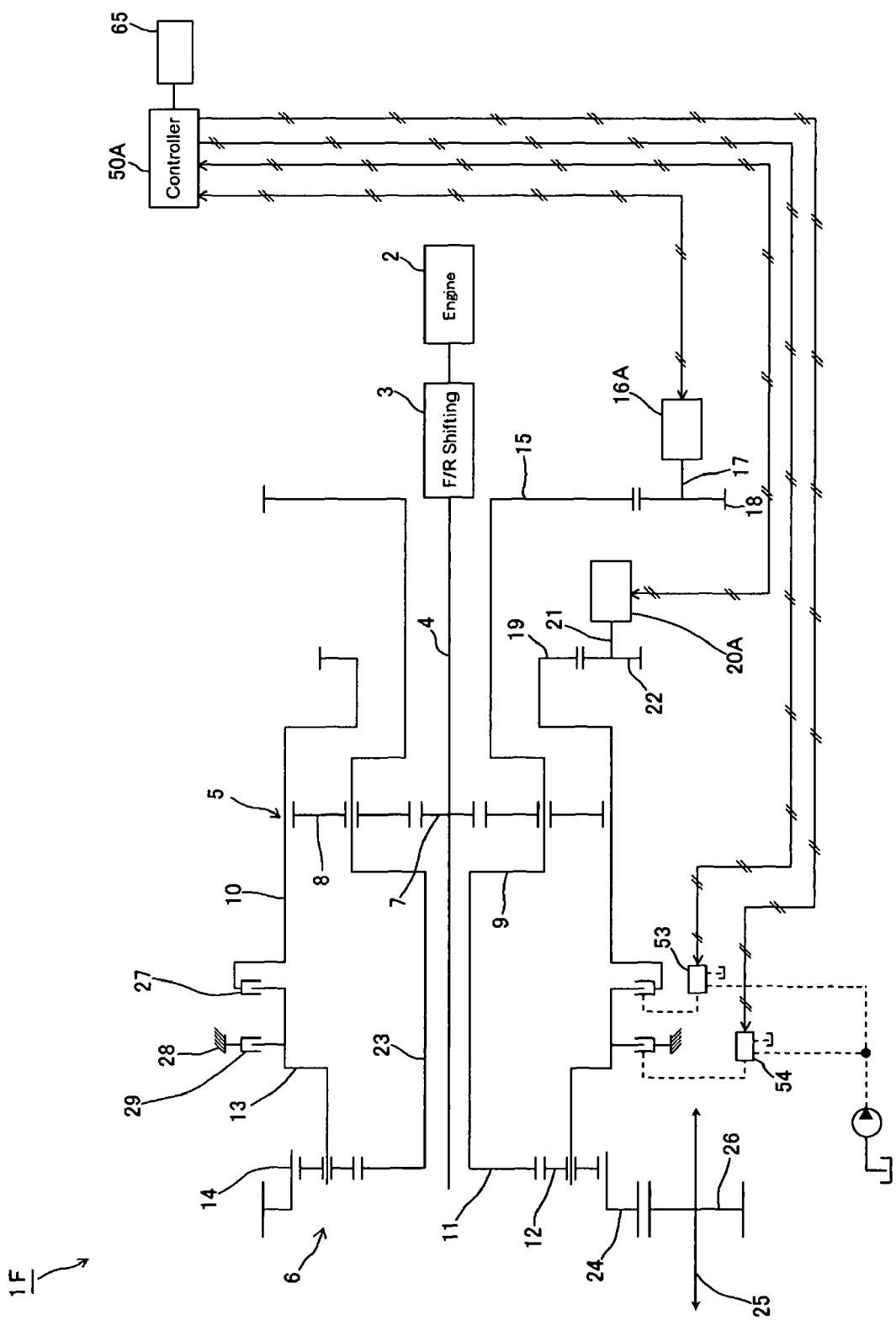
FIG. 12 is a schematic structural diagram of a transmission system according to a seventh embodiment of the invention.

FIG. 12 is a schematic structural diagram of a transmission system according to a seventh embodiment of the invention. The transmission system IF shown in FIG. 12 is one example of electro-mechanical transmissions in which the pumps/motors 16, of the first embodiment are replaced with generators/motors 16A, 20A. In this case, driving control of the generators/motors 16A, 20A is performed by a controller 50A connected to a battery 65. Herein, the controller 50A is formed such that an inverter circuit is incorporated into the above-described controller 50. It is desirable to interpose an electric storage device between the generator and the motor, for storing electric energy (this is also applied to the eighth to tenth embodiments described below). According to the seventh embodiment, a compact generator/motor having smaller capacity than the prior art can be used as the second generator/motor 20A, like the first embodiment.

Eighth Embodiment

Figure 13:
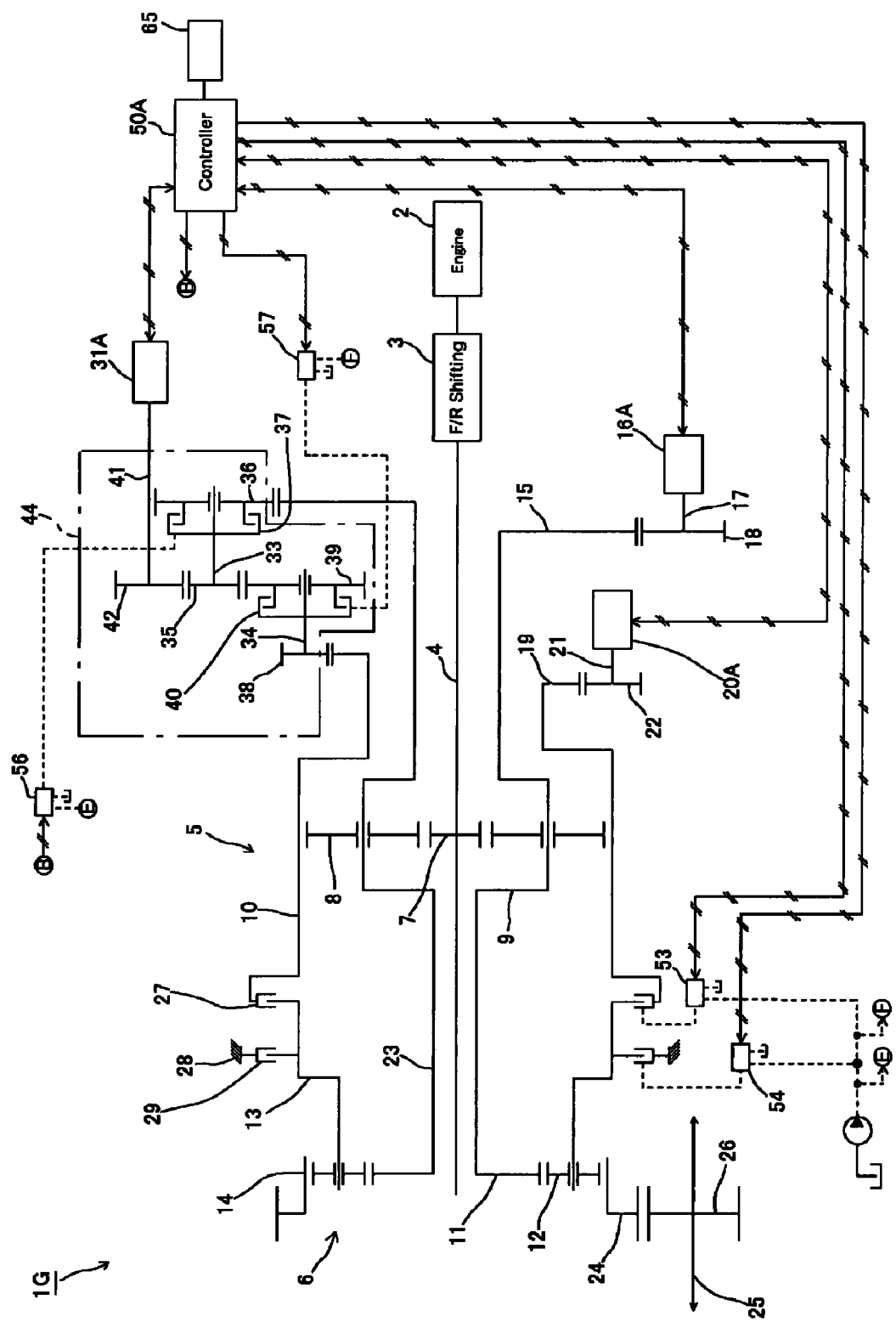
FIG. 13 is a schematic structural diagram of a transmission system according to an eighth embodiment of the invention.

FIG. 13 is a schematic structural diagram of a transmission system according to an eighth embodiment of the invention. The transmission system 1G shown in FIG. 13 is one example of electromechanical transmissions in which the pumps/motors 16, 20, 31 of the second embodiment are replaced with generators/motors 16A, 20A, 31A. In this case, driving control of the generators/motors 16A, 20A, 31A is performed by the controller 50A connected to the battery 65. According to the eighth embodiment, compact generators/motors having smaller capacity can be used as the generators/motors 16A, 20A, 31A like the second embodiment.

Ninth Embodiment

Figure 14:
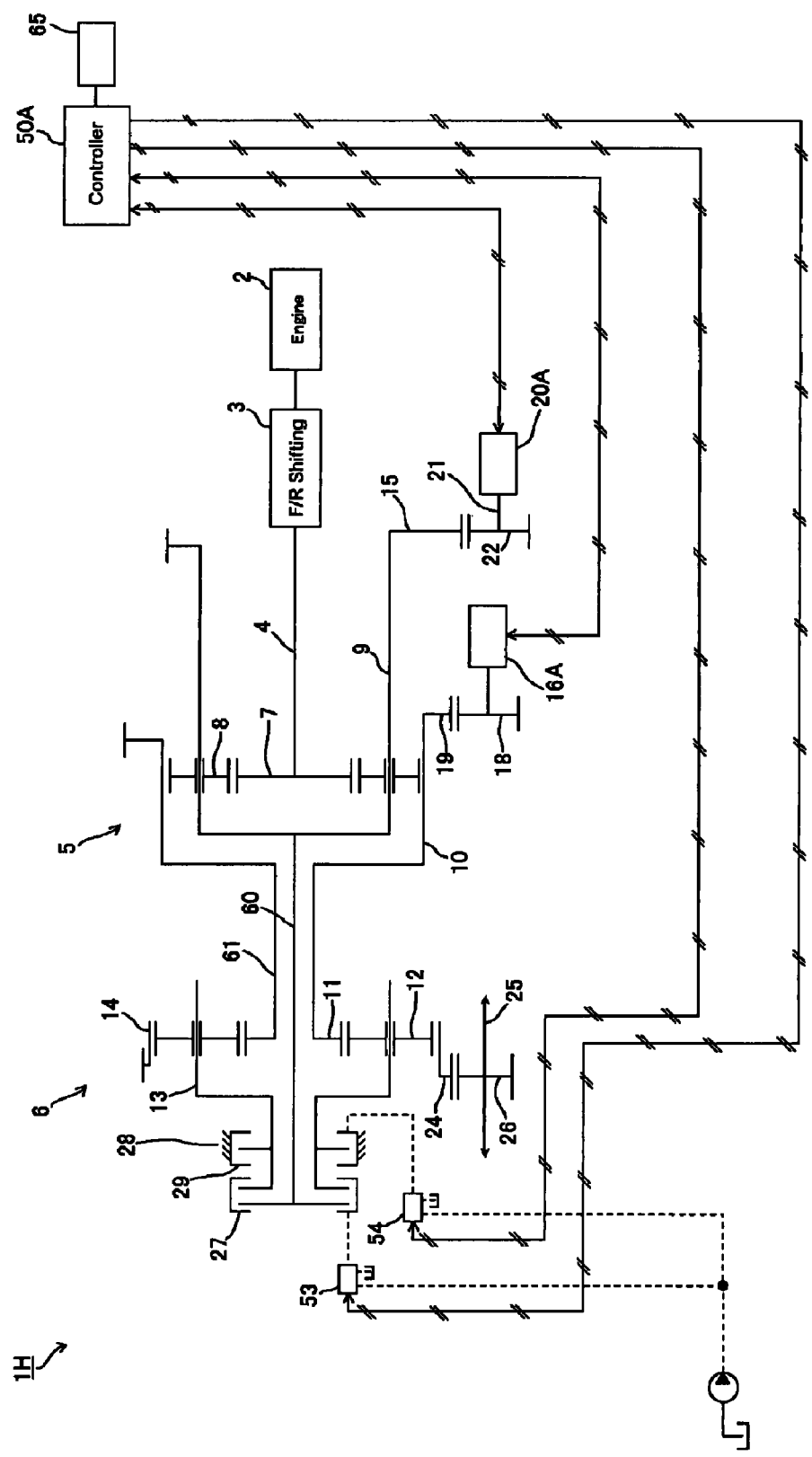
FIG. 14 is a schematic structural diagram of a transmission system according to a ninth embodiment of the invention.

FIG. 14 is a schematic structural diagram of a transmission system according to a ninth embodiment of the invention. The transmission system 1H shown in FIG. 14 is one example of electro-mechanical transmissions in which the pumps/motors 16, of the fourth embodiment are replaced with generators/motors 16A, 20A. In this case, driving control of the generators/motors 16A, 20A is performed by the controller 50A connected to the battery 65. According to the ninth embodiment, a compact generator/motor having smaller capacity than the prior art can be used as the second generator/motor 20A like the fourth embodiment.

Tenth Embodiment

Figure 15:
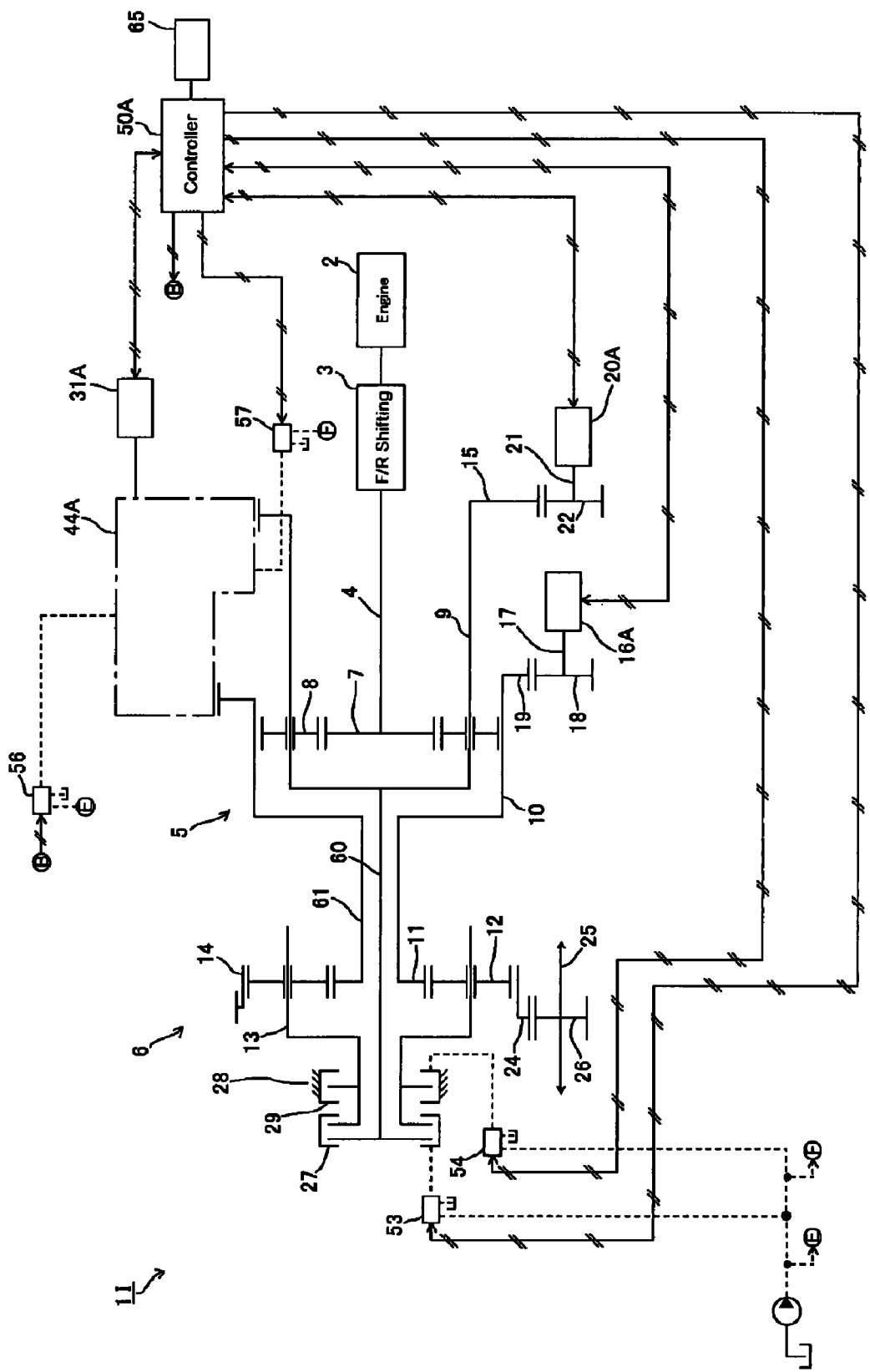
FIG. 15 is a schematic structural diagram of a transmission system according to a tenth embodiment of the invention.
Figure 16:
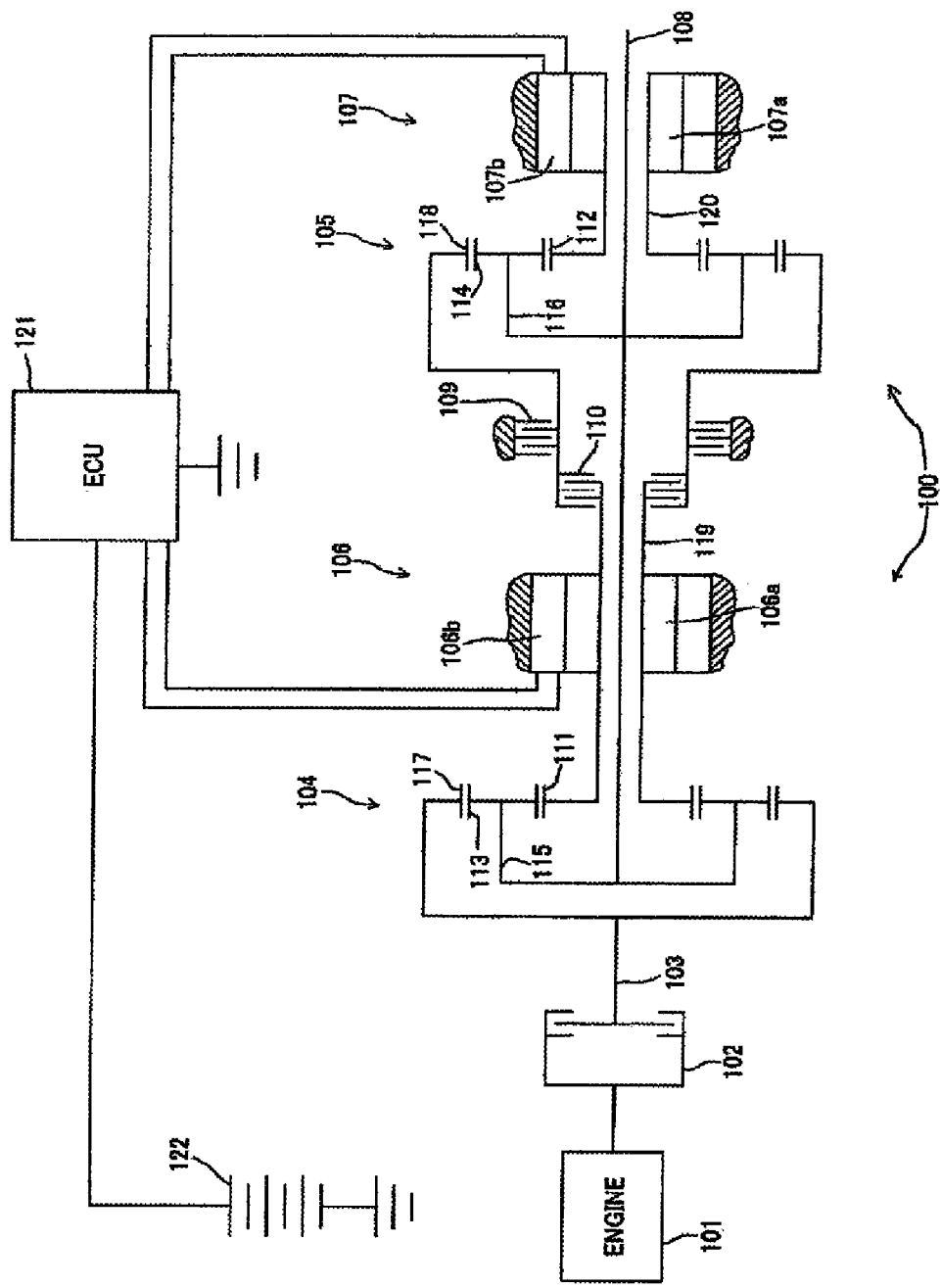
FIG. 16 is a schematic structural diagram of a transmission system according to a prior art technique.
Figure 17:
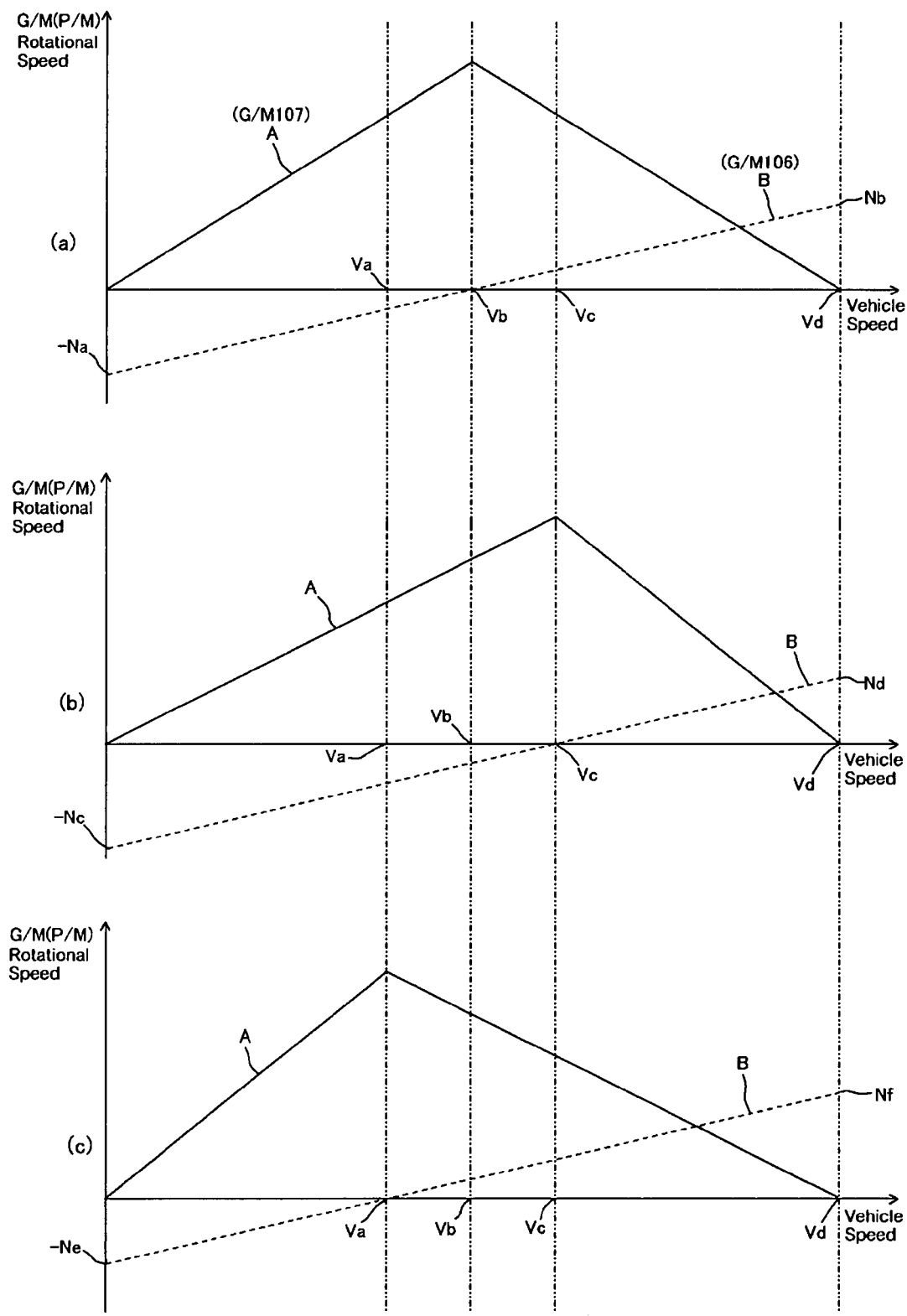
FIG. 17 shows graphs of set patterns for a mode switching point.

FIG. 15 is a schematic structural diagram of a transmission system according to a tenth embodiment of the invention. The transmission system 1I shown in FIG. 15 is one example of electromechanical transmissions in which the pumps/motors 16, 20, 31 of the fifth embodiment are replaced with generators/motors 16A, 20A, 31A. In this case, driving control of the generators/motors 16A, 20A, 31A is performed by the controller 50A connected to the battery 65. According to the tenth embodiment, compact generators/motors having smaller capacity can be used as the generators/motors 16A, 20A, 31A like the fifth embodiment.

Although the first to tenth embodiments described above may use hydraulic clutches, synchromesh mechanisms and dog clutches for the first to fourth clutches, the first to fourth clutches are not limited to these clutches but various types of clutch mechanisms such as electromagnetic clutches are applicable.

The invention claimed is:

1. A transmission system comprising:
an input shaft;
an output shaft;
a mechanical transmission section; and
an electric transmission section;
wherein the mechanical transmission section and the electric transmission section are interposed between the input shaft and the output shaft;
wherein the electric transmission section includes a plurality of generators/motors which are drivingly controlled by an inverter, the plurality of generators/motors including a first generator/motor and a second generator/motor;
wherein the mechanical transmission section has a first planetary gear train and a second planetary gear train;
wherein a sun gear of the first planetary gear train is continuously connected to the input shaft, a carrier of the first planetary gear train is continuously connected to a sun gear of the second planetary gear train and is connected to the first generator/motor, a ring gear of the first planetary gear train is connected to the second generator/motor, and a ring gear of the second planetary gear train is continuously connected to the output shaft;
wherein a first clutch is provided for engaging and disengaging a carrier of the second planetary gear train and the ring gear of the first planetary gear train with and from each other; and
wherein a second clutch is provided for engaging and disengaging the carrier of the second planetary gear train and a fixed end with and from each other.

2. The transmission system according to claim 1, wherein a low speed side direct point at which a rotational speed of the second generator/motor becomes zero to a speed ratio of a high speed side direct point at which a rotational speed of the first generator/motor becomes zero is set to 3 to 4.

3. The transmission system according to claim 1, wherein:
each of the carrier of the first planetary gear train and the carrier of the second planetary gear train includes a planetary gear.

4. The transmission system according to claim 1, wherein each of the first clutch and the second clutch comprises one of a dog clutch and a synchromesh mechanism.

* * * * *